(12) United States Patent
Segall et al.

(10) Patent No.: US 12,707,078 B1
(45) Date of Patent: Aug. 11, 2026

(54) VIDEO FRAME AFFINE MOTION COMPENSATION

(71) Applicant: Amazon Technologies, Inc., Seattle, WA (US)

(72) Inventors: Christopher Andrew Segall, Camas, WA (US); Kiran Mukesh Misra, Camas, WA (US); Byeongdoo Choi, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/745,556

(22) Filed: Jun. 17, 2024

Related U.S. Application Data

(60) Provisional application No. 63/552,070, filed on Feb. 9, 2024.

(51) Int. Cl.
*H04N 19/517* (2014.01)
*H04N 19/176* (2014.01)
*H04N 19/587* (2014.01)

(52) U.S. Cl.
CPC ......... *H04N 19/517* (2014.11); *H04N 19/176* (2014.11); *H04N 19/587* (2014.11)

(58) Field of Classification Search
None
See application file for complete search history.

(56) References Cited

U.S. PATENT DOCUMENTS

2006/0251169 A1* 11/2006 Wang .................. H04N 19/172 375/E7.181
2023/0239461 A1* 7/2023 Chang .................. H04N 19/54 375/240.16

OTHER PUBLICATIONS

U.S. Appl. No. 18/745,552, inventors Segall C.A, et al., filed Jun. 17, 2024.
US Non-Final Office Action dated Jun. 13, 2025 in U.S. Appl. No. 18/745,552.

* cited by examiner

*Primary Examiner* — Edemio Navas, Jr.
(74) *Attorney, Agent, or Firm* — Weaver Austin Villeneuve & Sampson LLP

(57) ABSTRACT

Frames may be encoded at different resolutions. A scaling factor may be used to scale video frames used for translational or affine motion compensation. Various improvements to motion compensation processes for different resolution video frames are described.

20 Claims, 24 Drawing Sheets

VIDEO FRAME AFFINE MOTION COMPENSATION

BACKGROUND

Video compression systems may typically include video encoding, decoding, and post-processing operations. A video encoder may receive videos with one or more color channels as inputs, and generate a coded bitstream as an output. The video decoder may receive the coded bitstream as the input and generate a decoded video stream. The video post-processor may perform certain post-processing operations on the decoded video frame to enhance the fidelity of the decoded video frame for a display device.

DETAILED DESCRIPTION

Video compression systems (or video codecs) can be used in various applications, e.g., Internet video (e.g., video on-demand (VOD)), digital cable, among other examples. The video codecs may include hardware and software components to perform video encoding, decoding, and post-processing operations based on any suitable standard, e.g., H.264, HEVC, VVC, VP9, or AV1. A video encoder may receive frames of videos (or images, pictures, etc.) with one or more color channels as the input and generate a coded bitstream as output. The video decoder may receive all or part of the coded bitstream and generate decoded frames. These decoded frames are similar to the frames received by the encoder but may not be identical. A post-processor may enhance the decoded frames to generate output frames for playback on a display device (e.g., TVs, computers, mobile devices, etc.).

During coding, motion compensation between frames may be used to increase efficiency. Motion compensation predicts a region in a current frame (also referred to as a predicted frame) from a region in a previous frame, wherein the region in the previous frame is determined based on one or more motion vectors. In some implementations, the predicted frame may also be encoded at a lower resolution compared to the previous frame. A scaling ratio (also referred to as a ratio or scaling factor) between the resolutions of both frames may be used to scale motion vectors between the predicted frame and the previous frame. However, as described further below, the complexity of the motion compensation may increase as the scaling factor increases, which is undesirable. Techniques herein address these and other problems to improve motion compensation processes.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
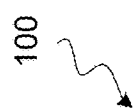
FIG. 1 illustrates an example of a high-level block diagram of a video system.
Figure 1:
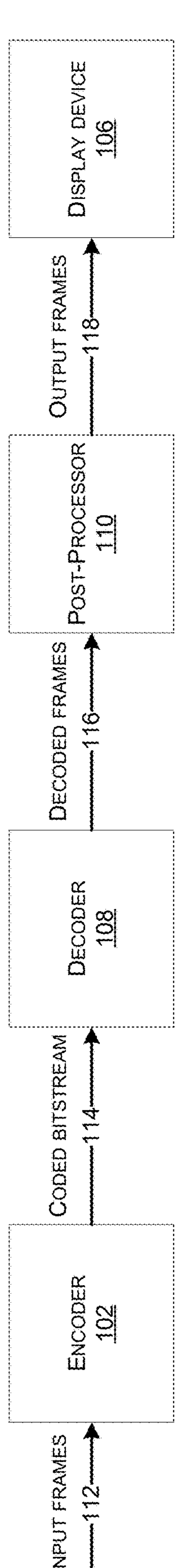

FIG. 1 illustrates an example of a high-level block diagram of a video system 100. The video system 100 may include an encoder 102, a decoder 108, an optional post-processor 110, and a display device 106.

Encoder 102 may encode video content for streaming, broadcast, or delivery to a receiving device. In some implementations, the encoded video content can be stored in a server, and can be streamed to a receiving device upon request. Encoder 102 may receive input frames 112 (or images) corresponding to a source video content. Encoder 102 may encode the video content into a coded bitstream 114 based on coding formats such as H.264, HEVC, VVC, VP9, or AV1, etc. Generally, the input frames 112 are received at a source frame resolution. However, to support different bitrates/resolutions, the video content can be resampled and be coded at different frame resolutions. The spatial resolution of a frame may also change on a frame-by-frame basis.

Coded bitstream 114 generated by encoder 102 can be streamed, broadcasted, or delivered to a receiving device using a suitable communication medium (e.g., network, cable, etc.). Coded bitstream 114 can also be stored, for example, at a content delivery server or in a content library to be streamed or downloaded to a receiving device at a later time. Decoder 108 can be part of a receiving device, and may receive coded bitstream 114. Decoder 108 may decode bitstream 114 according to the coding format of bitstream 114 to reconstruct decoded frames 116 of the video content. Decoded frames 116 may correspond to a decoder resolution, which may be the same or different than the resolution of the input frames 112. The resolution of the decoded frames 116 may also change on a frame-by-frame basis.

An optional post-processor 110 can be used to enhance the video content of decoded frames 116. For example, post-processor 110 may adjust the resolution of the decoded frames 116 and generate output frames 118 that matches the display resolution of display device 106. Examples of other enhancements that post-processor 110 can apply to generate output frames 118 may include color conversion, film grain synthesis, and debanding operations. In some implementations, post-processor 110 and decoder 108 can be part of the same receiving device. The receiving device can also be integrated with display device 106. Output frames 118 may be displayed on display device 106 for playback to viewers.

Figure 2:
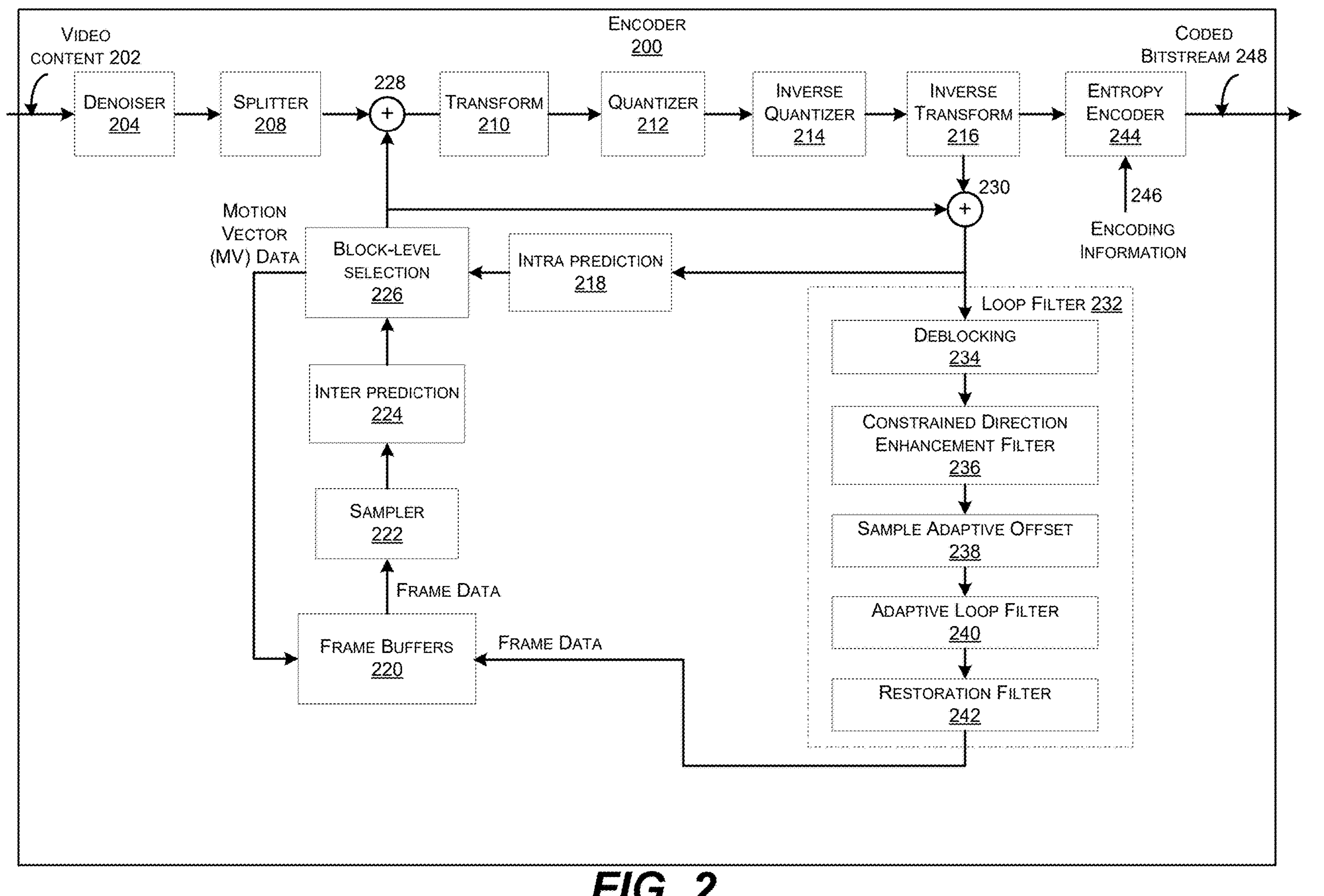
FIG. 2 illustrates an example of an encoder.

FIG. 2 illustrates a block diagram of an example of an encoder 200. Various components of encoder 200 can be implemented using hardware, software, or a combination thereof. While various components of encoder 200 are described herein, fewer than all components may be present in various embodiments. Encoder 200 is operable to receive input frames of video content 202. A denoiser module 204 may remove noise from the input frames using a suitable denoising process, e.g., spatial video denoising, temporal video denoising, spatial-temporal video denoising, etc. In most cases, denoising may be performed for both chroma and luma components. In some embodiments, a denoiser module 204 is not present. The denoised video content is provided to a splitter module 208.

Splitter module 208 is operable to split each frame into spatial regions for coding. These spatial regions may be referred to as macro-blocks, super-blocks, or coding tree units. Splitter module 208 may further partition the spatial regions. For example, each super-block in AV1 may be recursively split into coding blocks ranging in size from 128×128 samples to 4×4 samples with both square and rectangular shapes. Furthermore, splitter module 208 may also combine the spatial regions into larger spatial regions referred to as tiles or slices, etc. The recursive splitting and combining may be performed jointly or independently for the color channels. A sample (or pixel) may correspond to a specific location within a frame and color channel. For two-dimensional images, this specific location can be represented as a horizontal and vertical index into the color channel of the frame, which stores the value for the image at that index.

Each coding block can be first predicted using either intra-frame prediction, inter-frame prediction, or a combination of both. An intra-prediction module 218 is operable to predict a current coding block from previously coded and spatially neighboring blocks. This prediction can be performed with directional intra-prediction that predicts the sample values of the current coding block by extrapolating previously coded information along a prediction direction. The prediction can also be performed with non-directional intra-prediction, such as non-directional smooth intra-prediction, recursive intra-prediction, intra-block copy, and/or color palette techniques.

An inter-prediction module 224 is operable to use information from previously coded frames for predictions that are stored in one or more frame buffers 220. In some implementations, a translational motion model can be used to perform this prediction. In this approach, the spatial offsets (or motion vectors) between the current coding block and a previously decoded frame can be used to translate a region of the previously coded frame, and may use the translated version for prediction. Different precisions for the motion vectors are possible, such as 1/8 pixel motion vector accuracy. Additionally, different interpolation filters can also be selected. In addition to a translational motion approach, alternative methods (or prediction models) for performing inter-frame prediction, such as, affine motion compensation or overlapped block motion compensation, can be used. Moreover, one or more of these models can predict the current coding block from more than one previously coded locations in previously decoded frames, e.g., similar to the compound prediction mode in AV1. In some implementations, more than one prediction may be combined by computing a weighted average based on the temporal distance between each previously coded block and the current coded block. In the case that the previously coded frame is a different resolution than the input frame, a sampler module 222 may be used to optionally convert the spatial resolution of a previously coded frame.

In some implementations, a block-level selection module 226 can use a combination of intra-frame and inter-frame prediction for a current coded block. For example, a coding block can be divided into two regions. The first region can be predicted using an intra-frame prediction method performed by the intra-prediction module 218, and the second region can be predicted using an inter-frame prediction region predicted by the inter-prediction module 224. In some implementations, an intra-frame prediction and an inter-frame prediction can be averaged to predict the current coding block.

Following the prediction of each block, residual information can be added to the prediction by an adder 228. A difference between the prediction and the original frame can be calculated, and an optional transform to the difference can be applied by a transform module 210. A quantizer 212 is operable to quantize the coefficients that are output by the transform module 210. An inverse quantizer 214 is operable to de-quantize the quantized coefficients computed by quantizer 212. An inverse transform module 216 is operable to apply an optional inverse transform to the de-quantized coefficients. The result of the inverse transform can be added to the predicted block using an adder 230 to compute the residual. In some cases, the sequential process of quantization and de-quantization may not result in the same output as the input that was provided to the quantization process. Similarly, the sequential process of a transform followed by an inverse transform may not result in the same output as the input that was provided to the transform.

The reconstructed block corresponding to the addition of the prediction and residual information can then be processed by one or more in-loop filters 232. The loop filters 232 may improve the fidelity of reconstructed blocks and include processes such as deblocking filters 234, constrained directional enhancement filter 236, sample adaptive offset filters 238, adaptive loop filters 240, and loop restoration filters 242. These operations may use different partitioning than the reconstructed blocks. The frame data output of the one or more loop filters 232 can be stored in frame buffer 220 (or decoded picture buffer) to be used by the inter-prediction module 224 in the inter-prediction of coding blocks in different frames. In some implementations, the output can be processed by post-processing filters to further modify the output.

Information computed during the encoding process may be signaled in a bitstream. For example, partitioning of the regions for coding, intra prediction directions, motion vectors, quantized transform coefficients, and in-loop filter control information can be signaled based on encoding information 246 provided by one or more of these operations. An entropy encoder 244 can be used to generate a coded bitstream 248 using an entropy coding system based on the encoding information 246. For example, in the case of AV1, the entropy coding system may use an M-ary arithmetic coder. In the case of VVC, the entropy coding system may use a context-adaptive binary arithmetic coder. The encoding information 246 and the encoded video content may be extracted from the coded bitstream 248 by a decoder.

In some implementations, the bit stream 114 comprising the coded bitstream 248 can be packetized into one or more container units. In the case of AV1, the bitstream 114 can be packetized into Open Bitstream Units (OBUs). In the case of VVC, the bitstream 114 can be packetized into Network Abstraction Layer Units (NALUs). Different types of packetized containers can be used, such as frame packet types, sequence header packet types, frame header packet types, metadata packet types, temporal delimiter packet types, and/or tile group packet types.

Figure 3:
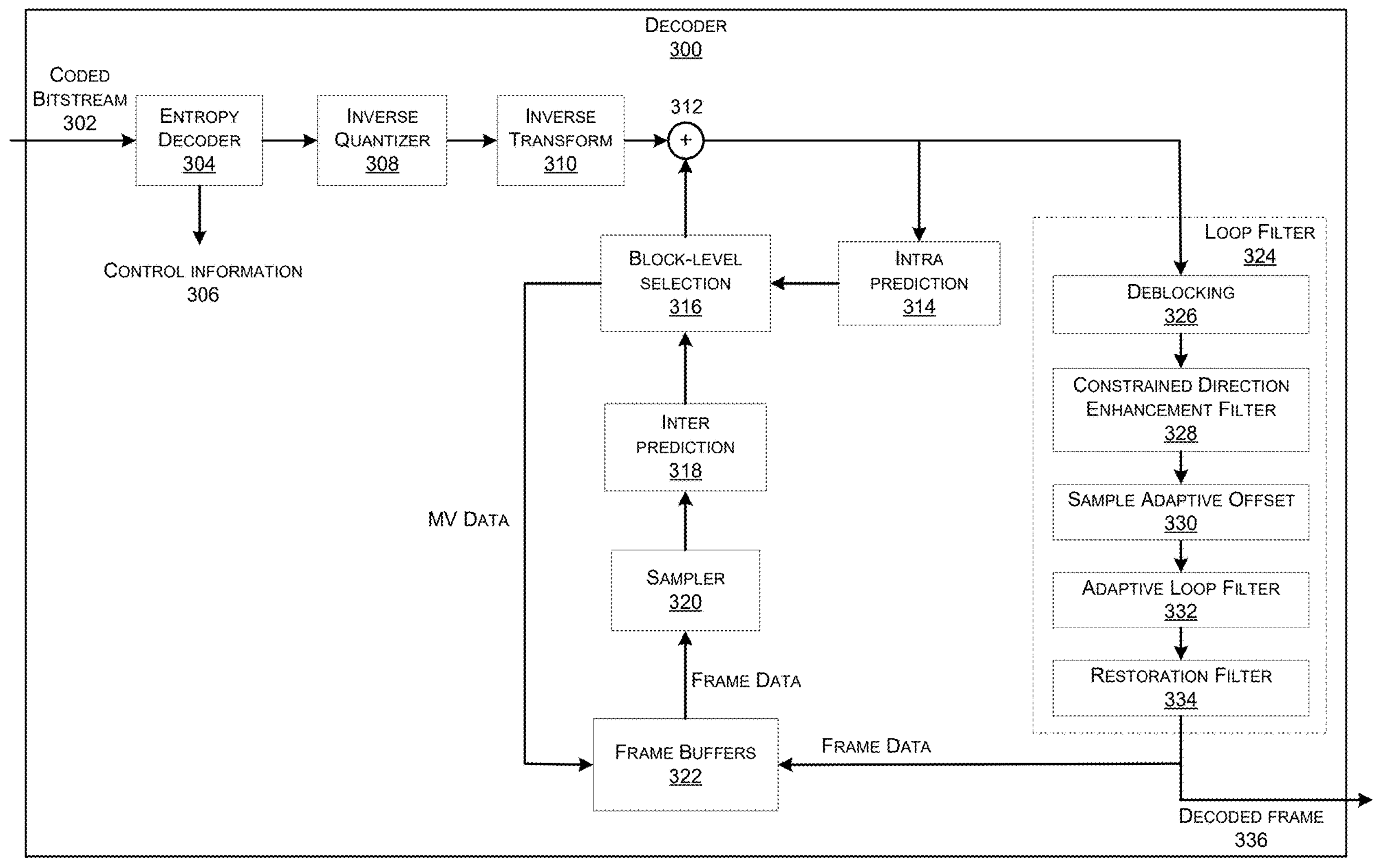
FIG. 3 illustrates an example of a decoder.

FIG. 3 illustrates a block diagram of an example of a decoder 300. Various components of decoder 300 can be implemented using hardware, software, or a combination thereof. Decoder 300 may obtain a coded bitstream 302, for example, from a content delivery service. An entropy decoder 304 is operable to decode and parse bitstream 302, and generate quantized coefficients as the output, as well as control information 306 that can be used by other operations within the decoder 300 and for post-processing operations. For example, control information 306 may include encoder information 246 generated by the encoding process, among other information.

The quantized coefficients generated by the entropy decoder 304 can be inverse quantized by an inverse quantizer 308, and (optionally) inverse transformed by an inverse transform module 310 to generate a residual. The residual can be added by an adder 312 to a block-level prediction that is generated by intra-prediction, inter-prediction, or combined prediction process. For example, outputs from an intra-prediction module 314 and an inter-prediction module 318 can be used by a block-level selection module 316 to generate the block-level prediction. The intra-prediction module 314, the inter-prediction module 318, and the block-level selection module 316 may operate in a similar as the prediction and selection blocks of encoder 200.

The resulting sample values from the adder 312 can be processed by a loop filter 324. For example, loop filter 324 can perform loop filter operations that may include deblocking 326, constrained direction enhancement filter 328, sample adaptive offset 330, adaptive loop filter 332, and a restoration filter 334. The output of the loop filter 324 can be stored in one or more frame buffers 322 to be used by the inter-prediction process, and is also provided as an output of decoder 300 representing a decoded frame 336. In some examples, when the data stored in the frame buffer 322 does not have the same spatial resolution as a current frame, the data stored in the frame buffer 322 can be resampled by the inter-prediction process using a sampler module 320 to the same resolution as the current frame. The sampler module 320 may operate in a similar as the sampler module of the encoder 200.

Figure 4:
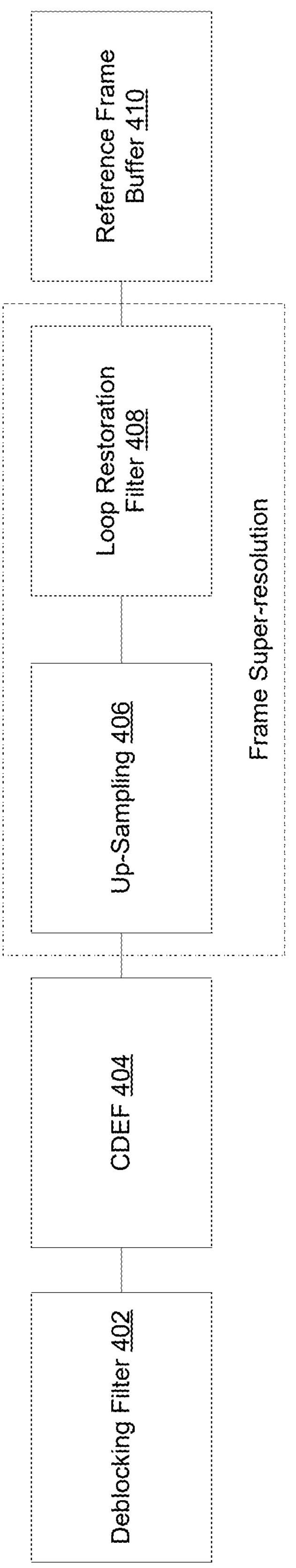
FIG. 4 illustrates an example of in-loop filter operations.

FIG. 4 illustrates a simplified block diagram of in-loop filter operations that can be performed to generate a reference frame for storing in reference frame buffer 410. The reference frame can be used, for example, for prediction of later frames. A deblocking filter 402 can be applied across the transform block boundaries to remove block artifacts caused by a quantization error. A constrained directional enhancement filter (CDEF) 404 can be used to apply a non-linear deringing filter along certain (potentially oblique) directions.

In some coding systems, the source input can be downscaled from the original video signal. A frame super-resolution process is used to convert an intermediate representation of the reconstructed frame to a higher resolution. The frame super-resolution consists of an upsampling stage 406 and a loop restoration filter 408. The upsampling stage 406 is applied to the reconstructed pixels after the CDEF filter 404. In some implementations, the upsampling stage 406 can be applied to only the horizontal direction. The loop restoration filter is applied to units referred to as loop restoration units (LRU), which can be of various sizes such as 64×64, 128×128, or 256×256 pixel blocks. Each unit can independently select either to bypass filtering, to use a Wiener filter, or to use a self-guided filter.

Translational Transformation

FIGS. 5A-E illustrate examples of translational prediction between prediction and previous frames. As noted above, inter frame prediction may use information from previously coded frames for prediction that are stored in one or more frame buffers. One method for performing this prediction uses a translational motion model. In some implementations, spatial offsets (or motion vectors) between a current coding frame and a previously decoded frame are used to translate a region of the previously coded frame and use the translated version for prediction. In some implementations, different precisions for the motion vectors are used, such as 1/8 pixel motion vector accuracy. Different interpolation filters may also be selected. While the following description refers to predicting frames from previously coded frames, in some embodiments a translational motion model operates on portions of frames, e.g., blocks or tiles. As noted above, a frame may be split into spatial regions for encoding, and techniques herein may operate on such spatial regions. Thus, references in the following description to a current frame, previously coded frame, or intermediate frame should be understood to also apply to portions of such frames.

In some implementations, translational motion is used to predict a current frame from one or more previously coded frames that have a resolution different from the current frame. This may be expressed as $$\text{Prediction}(x,y)=\text{Previous}(Sx*(x+mvx),Sy*(y+mvy)) \quad \text{EQ. 1}$$

where Prediction(x,y) denotes a sample in the current coding frame, Previous(x,y) denotes a sample in a previously decoded frame, x denotes a horizontal location, y denotes a vertical location, (mvx, mvy) denotes a motion vector, mvx denotes a horizontal component of the motion vector, mvy denotes a vertical component of the motion vector, Sx denotes the scaling ratio between the previously coded frame and the current frame in the horizontal dimension, and Sy denotes the scaling ratio between the previously coded frame and the current frame in the vertical dimension. For example, when the current frame and the previous frame have a horizontal spatial dimension of A samples and B samples, respectively, Sx is equal to B/A. In a specific example, when the current frame and the previous frame have a horizontal dimension of 1920 samples and 3840 samples, respectively, Sx is equal to 2.

In some embodiments, scaling ratios between frames may be rounded. For example, a previous frame may have a resolution of 3800 and the current frame may have a resolution of 1920. In such an embodiment, the ratio is 1.97. In such an embodiment, the ratio may be rounded to the nearest whole number. In some embodiments, the ratio may be rounded to the nearest whole or half number, e.g., 1.5, 2, 2.5, 3, etc. The rounded ratio may then be used as Sx, or Sy as described herein. In some embodiments, a ratio of a previous frame to a current frame is a number greater than 1, i.e., the resolution of the previous frame divided by the resolution of the current frame, where the resolution of the previous frame is greater than the resolution of the current frame.

In some embodiments, one or two scaling ratios may be used for motion compensation. A horizontal and vertical scaling ratio are described throughout the specification, i.e., Sx and Sy, respectively. However, in some embodiments only one scaling ratio may be used, e.g., a vertical scaling ratio. In some embodiments, the horizontal and vertical scaling ratios are the same, e.g., both are 1.5, 2, 3, 4, or 6. In some embodiments, the horizontal and vertical scaling ratios are different.

Figure 5A:
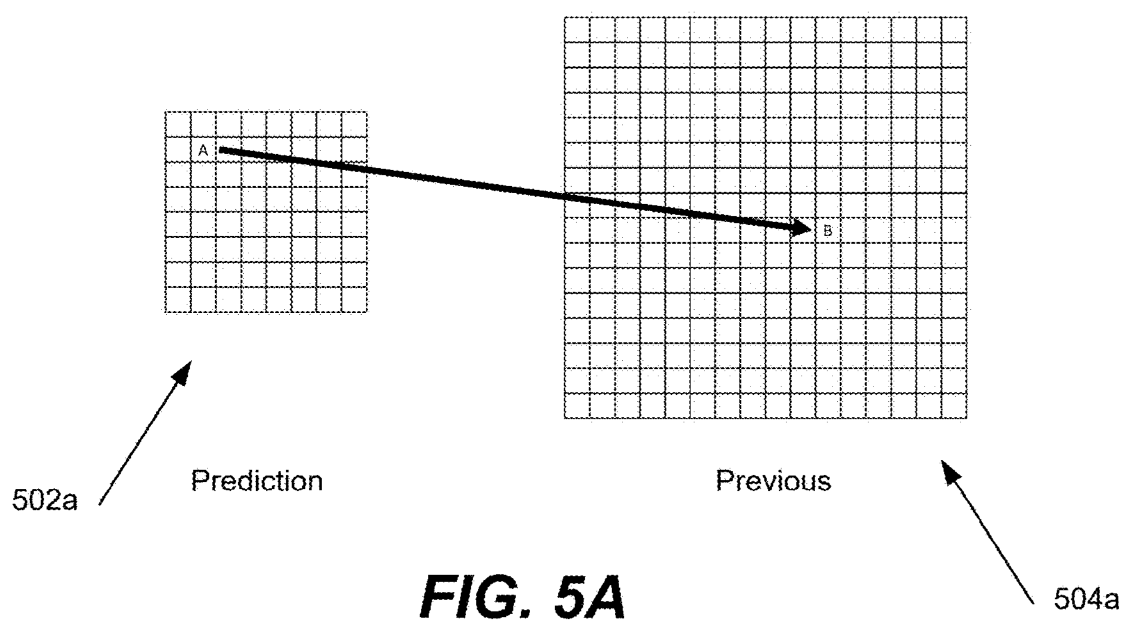
FIGS. 5A-E illustrate examples of determining translational motion compensation.

FIG. 5A presents an example of performing translational motion prediction across images of different resolutions. The size of prediction frame 502*a* and previous frame 504*a* are not the same. Here, the value for a location A in the predicted frame 502*a* corresponds to the value for a location B in the previously decoded frame 504*a*. In this specific example, the location A corresponds to location (1,1) in the predicted frame, where the upper-left location in the frame is denoted as location (0,0), B corresponds to location (10,8) in the previous frame, Sx is equal to 2, Sy is equal to 2, mvx is equal to 4, and mvy is equal to 3. This may be expressed as x=Sx*(x+mvx) and y=Sy*(y+mvy).

Figure 5B:
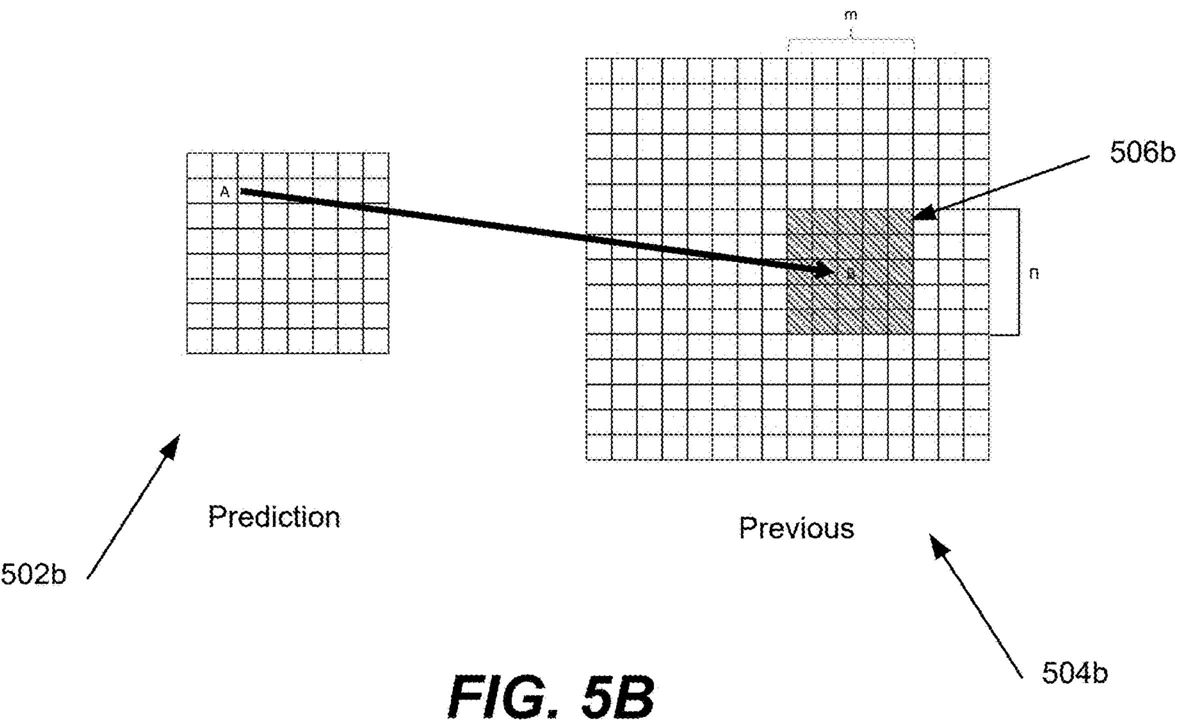

FIG. 5B presents an example of determining a prediction value across images of different resolutions with sub-pel accuracy. As described above, motion vectors may have sub-pel accuracy. In some implementations, this sub-pel accuracy is realized by using an interpolation process to determine the predicted value from a previously decoded frame. This may be expressed as $$Prediction(x,y)=Sum(Filter(i,j)*Previous(Sx*(x+mvx)-i,Sy*(y+mvy)-j)) \quad EQ.2$$

where i is equal to all integer values in the range of −m/2 to m/2, j is equal to all integer values in the range −n/2 to n/2, Filter refers to a filter kernel, m is the width of the filter kernel, n is the height of the filter kernel, and/denotes a division operation. In some embodiments, the division operation corresponds to an integer division operation. For example, the value 5/2 may correspond to a value of 2.

In FIG. 5B, the value for a location A in the predicted frame 502*b* is determined by a cross-hatched region 506*b* in the previously decoded frame 504*b*. In some implementations, the location B corresponds to an integer value of a scaled motion vector. This may be expressed as:

$$Bx=round(Sx*(Ax+mvx)) \quad EQ. 3$$

$$By=round(Sy*(Ay+mvy)) \quad EQ. 4$$

where Ax and Ay are respectively the horizontal and vertical coordinates of A, Bx and By are respectively the horizontal and vertical coordinates of B, and round(x) is an operation that returns the nearest integer value closest to x. For example, integer(5.75) would return the value 6.

In FIG. 5B, the cross-hatched region 506*b* denotes a filter kernel (e.g Filter) with width m and height n. In one example, the values of the filter kernel are determined by the fractional value of the scaled motion vector. For example, in the case of 1/2 pel motion vector accuracy, the filter kernel may be assigned as

| Phasex | Phasey | FilterIndex |
|---|---|---|
| 0 | 0 | 0 |
| 0 | 1 | 1 |
| 1 | 0 | 2 |
| 1 | 1 | 3 |

where each value of FilterIndex denotes a filter kernel comprising a set of filter values, and PhaseX and Phasey are expressed as:

$$Phasex=fraction(Sx*(Ax+mvx))*(1/MotionVectorAccuracy) \quad EQ. 5$$

$$Phasey=fraction(Sy*(Ay+mvy))*(1/MotionVectorAccuracy) \quad EQ. 6$$

where Motion VectorAccuracy is ½ in the example, and fraction(x) is an operation that returns the fractional component of the value x. For example, fraction(5.5) would return the value 0.5.

Figure 5C:
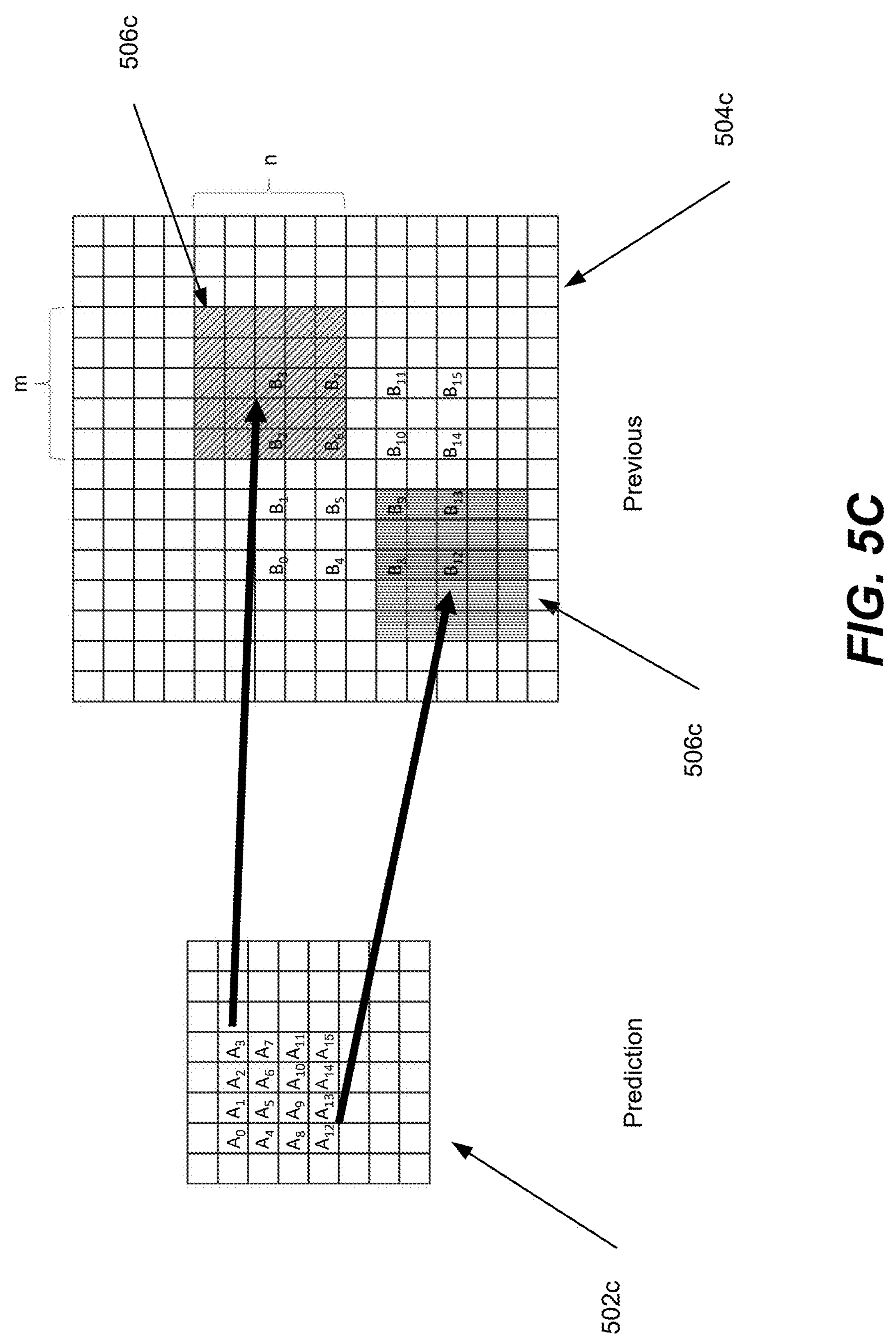

FIG. 5C illustrates an example of a motion vector corresponding to a set of samples in a prediction frame 502*c* and a previous frame 504*c*. In FIG. 5C, samples A0, A1, . . . , A14, A15 denote samples in the current coding frame 502*c* corresponding to a same motion vector. The value at location A3 is determined by applying a filter to samples 506*c* in the previous frame 504*c*, denoted with the diagonal down-right cross-hatch mark. Other values in prediction frame 502*c* may be determined from filters applied to samples in the previous frame centered around corresponding integer locations. For example the sample at location A12 is determined from a filter applied to samples 506*c* in the previous frame 504*c* denoted with the vertical cross-hatch mark.

Notably, the filter applied to previous frame 504*c* may have a stride greater than one. Stride typically refers to the movement of a filter across a frame. A stride length of one indicates a filter moved across an image by one pixel in between applying the filter. A stride length greater than one (or more typically defined in x and y coordinates, e.g., (2,2)) specifies that the filter moves a number of pixels equal to the stride length before convolution. In FIG. 5C, where the previous frame 504*c* has a vertical and horizontal scaling factor of 2 compared to prediction frame 502*c*, the coordinates of B0-B15 are each two pixels apart as determined using equations 3 and 4. Thus, a stride length for applying filters in FIG. 5C is (2,2), i.e., the filter moves by two pixels to center the filter on each of locations B0-B15.

In some embodiments, filtering operations may be separable. Separable filtering operations may be determined by the sequential application of one or more one-dimensional filtering operations. For example, a separable filtering operation could be determined by a horizontal filter operation followed by a vertical filter operation, or vice versa.

Figure 5D:
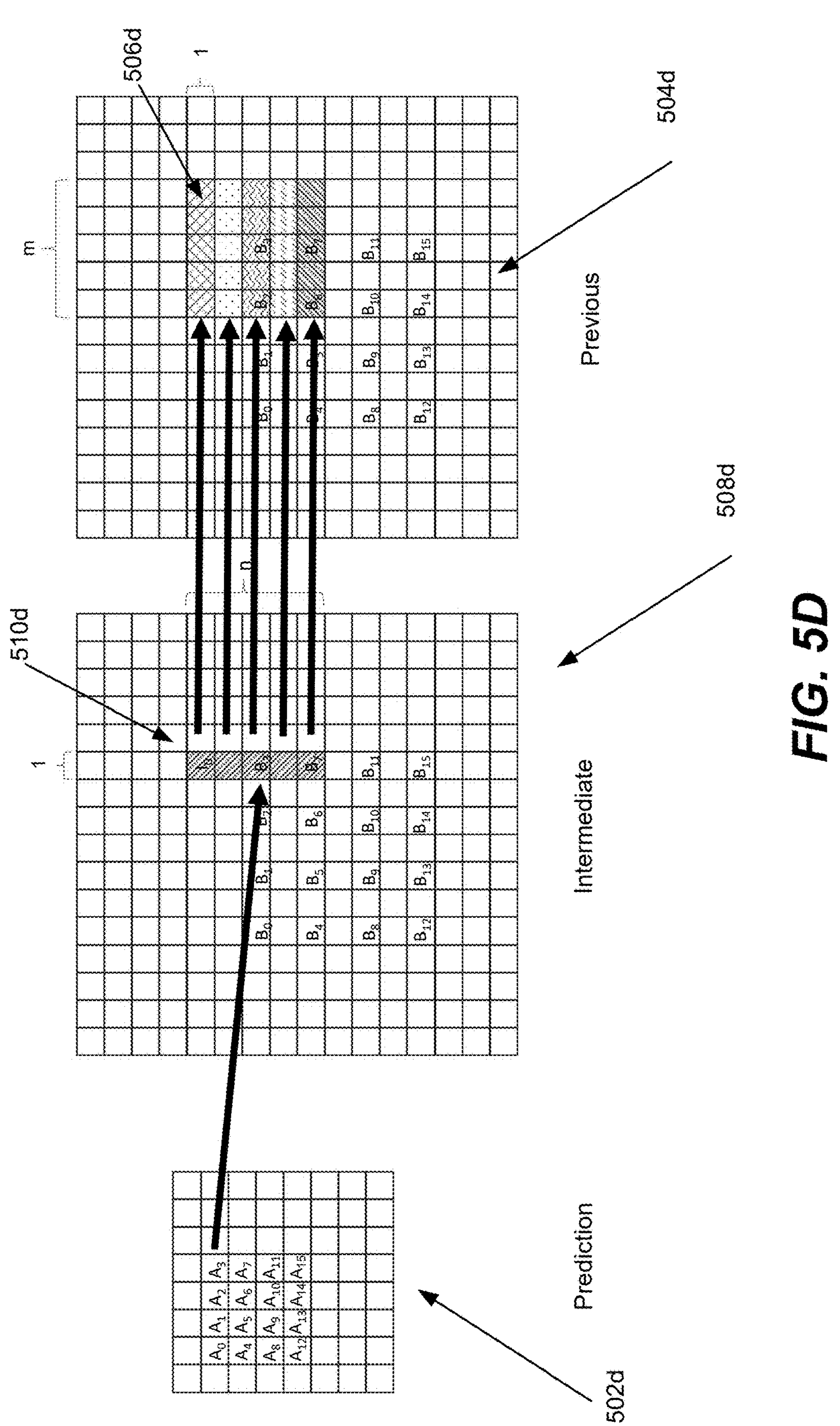

FIG. 5D illustrates prediction of a sample at location A3 in a prediction frame 502*d* by separable filtering operations. In some embodiments, the first step of a separable operation determines an intermediate frame 508*d* by applying a horizontal filtering operation to a previous decoded frame 504*d*. For example, the intermediate location I0 is determined by performing a filtering operation using samples 506*d* denoted with the ‘x’ cross-hatch in the previously decoded frame and a filter with width equal to m and height equal to one. Similarly, the intermediate location B7 is determined from the samples denoted by the down-left cross hatch. The value of the sample at location A3 may then be determined by performing a filtering operation using intermediate values 510*d*, denoted with the down-right cross-hatch, and a filter with height n and width equal to one. While the example of FIG. 5D illustrates determining intermediate frame 508*d* based on a horizontal filtering operation followed by determining prediction frame 502*d* based on a vertical filtering operation, in some embodiments the vertical filtering operation may be performed first to generate intermediate values, followed by a horizontal filtering operation on the intermediate values.

In some examples, the values of the horizontal and vertical filter kernel are determined by the fractional value of the scaled motion vector. For example, in the case of 1/2 pel motion vector accuracy, the filter kernel may be assigned as:

| Phasex | Phasey | Horizontal FilterIndex | Vertical FilterIndex |
|---|---|---|---|
| 0 | 0 | 0 | 0 |
| 0 | 1 | 0 | 1 |
| 1 | 0 | 1 | 0 |
| 1 | 1 | 1 | 1 |

where each combination of Horizontal FilterIndex and Vertical FilterIndex denotes a filter kernel comprising a set of filter values.

One benefit of separating filtering operations is reduced memory requirements. For example, a two-dimensional filtering operation with width equal to 5 and height equal to 5 may correspond to four filters each with 25 (e.g. m*n) different coefficient values. This results in a total of 100 different coefficient values. Alternatively, a separable filtering operation that uses a horizontal filter of width equal to 5 and a vertical filter with height equal to 5 (the other dimension for both filters being 1) requires two horizontal filters with 5 coefficient values and two vertical filters with 5 coefficient values. This results in a total of 20 different coefficient values, a significant reduction in coefficient values to be used while generating the same prediction frame.

Figure 5E:
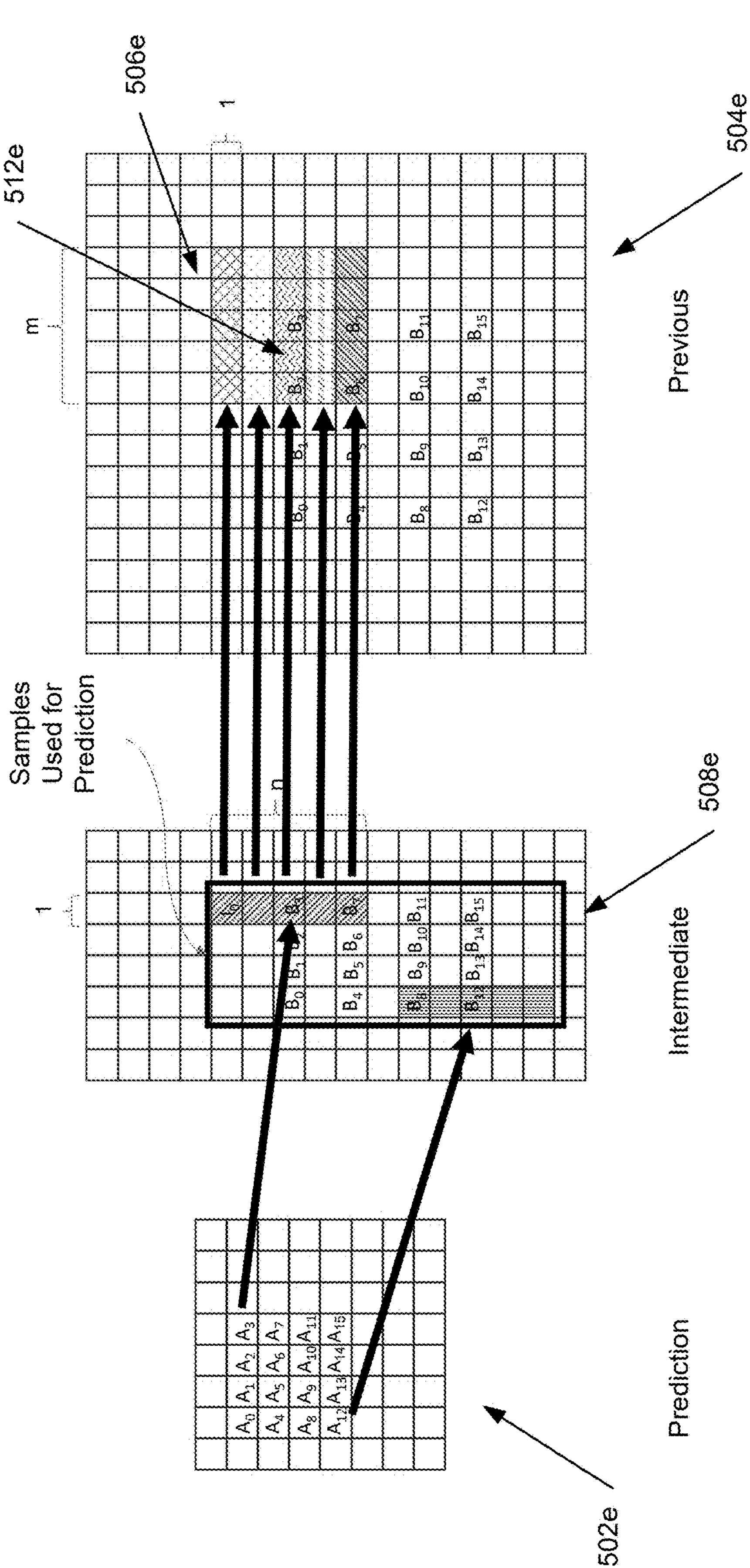

FIG. 5E illustrates another embodiment for using separable filters. In FIG. 5E, a prediction for the sample locations A0, A1, . . . , A14, A15 in the current frame are determined with a separable filtering operation and use the same motion vector for all locations. The first step of the separable operation may determine an intermediate frame 508*e* by applying a horizontal filtering operation and then a decimation operation to a previously decoded frame 504*e*. For example, the value at intermediate location I0 is determined by performing a filtering operation using samples 506*e* denoted with the 'x' cross-hatch in the previously decoded frame and a filter with width m and height equal to one. Similarly, the value at intermediate location B7 is determined from samples denoted by the down-left cross hatch.

Intermediate frame 508*e* may also be characterized by a decimation operation to remove samples that will not be used for subsequent filtering operations. For example, sample 512*e* is used for the horizontal filtering operation to generate intermediate frame 508*e*, but will not be used for a vertical filtering operation to generate prediction frame 508*e*. By removing sample 512*e* when generating intermediate frame 508*e* the size of intermediate frame 508 is reduced, reducing unnecessary memory usage.

The value of the sample at location A3 may then be determined by performing a filtering operation using the intermediate values denotes with the down-right cross-hatch and a filter with height n and width equal to one. Other prediction samples are also determined from the samples in the intermediate frame. For example the sample at location A12 is determined from the samples in the previous frame denoted with the vertical cross-hatch mark.

One benefit of using a separable filtering operation when the same motion vector is used for a set of sample locations is reduced complexity. As can be seen in FIG. 5E, the separable filtering operation first determines an intermediate frame 508*e* by a horizontal filtering operation. Samples in this intermediate frame are then used to determine the set of predicted samples using a vertical filtering operation. The samples required to perform the vertical filtering operation shown in FIG. 5E corresponds to the region denoted as 'Sampled Used For Prediction', and this region has a width and height expressed as $$\text{SupportRegionx}=\text{BlockSizex} \qquad \text{EQ. 7}$$

$$\text{SupportRegiony}=Sy^*(\text{BlockSizey}-1)+n \qquad \text{EQ. 8}$$

where SupportRegionx and SupportRegiony are the width and height of the region required to perform the vertical filtering operation, and BlockSizex and BlockSizey are the width and height of the set of predicted samples.

In this example, the number of multiplies required to determine the prediction from the previous frame is expressed as:

$$\text{NumberOfMultiplies}=\text{NumberOfPredictedSamples}^*n+\text{NumberOfSupportRegionSamples}^*m \qquad \text{EQ. 9}$$

where the NumberOfPredictedSamples is the number of samples in the set of predicted samples using the same motion vector, and NumberOfSupportRegionSamples is the number of samples in the intermediate frames that are used for prediction (e.g. SupportRegionx*SupportRegiony). In a specific example, where the width and height of the set of predicted samples are both 4, Sx is equal to 2, Sy is equal to 2, m is equal to 5 and n is equal to 5, we see that the number of multiplies to compute the set of predicted samples is 300 multiplies. By comparison, using the non-separable filtering approach shown in FIG. 5C requires 400 multiplies (e.g. 16 samples*25 filter coefficients).

In some implementations, the complexity of the separable filtering operation when the same motion vector is used for a set of sample locations may depend on the scale change between the previous and prediction frames. For example, when the width and height of the set of predicted samples are both 4, m is equal to 5, n is equal to 5, but Sx and Sy are both equal to 1, the number of multiplies to compute the set of predicted samples is reduced to 240 multiplies. By comparison, the complexity of the non-separable filtering approach shown in FIG. 5C does not change based on the scaling ratio parameters Sx and Sy, and the operation requires 400 multiplies (e.g. 16 samples*25 filter coefficients).

In some implementations, when using a translational motion process to predict a set of pixels in a predicted frame from a previous frame with a different resolution, the complexity of the motion vector process may depend on the scaling ratio. It would be desirable to use a motion vector process that does not scale in complexity based on the scaling ratio.

Disclosed herein are methods, systems, and computer program products to perform translational motion compensation across resolutions and with sub-pel accuracy. In some implementations, the number of multiplies for techniques disclosed herein does not depend on a scaling ratio between frames. In some implementations, an interpolation process is expressed as $$\text{Prediction}(x,y)=\text{Sum}(\text{Filter}(i,j)^*\text{Previous}(Sx^*(x+mvx-i),Sy^*(y+mvy-j))) \qquad \text{EQ. 10}$$

where i is equal to all integer values in the range of −m/2 to m/2, j is equal to all integer values in the range −n/2 to n/2, Filter is a filter kernel, m is the width of the filter kernel, n is the height of the filter kernel, and/denotes a division operation. In some implementations, the division operation corresponds to an integer division operation. For example, the value 5/2 may correspond to a value of 2.

Figure 6A:
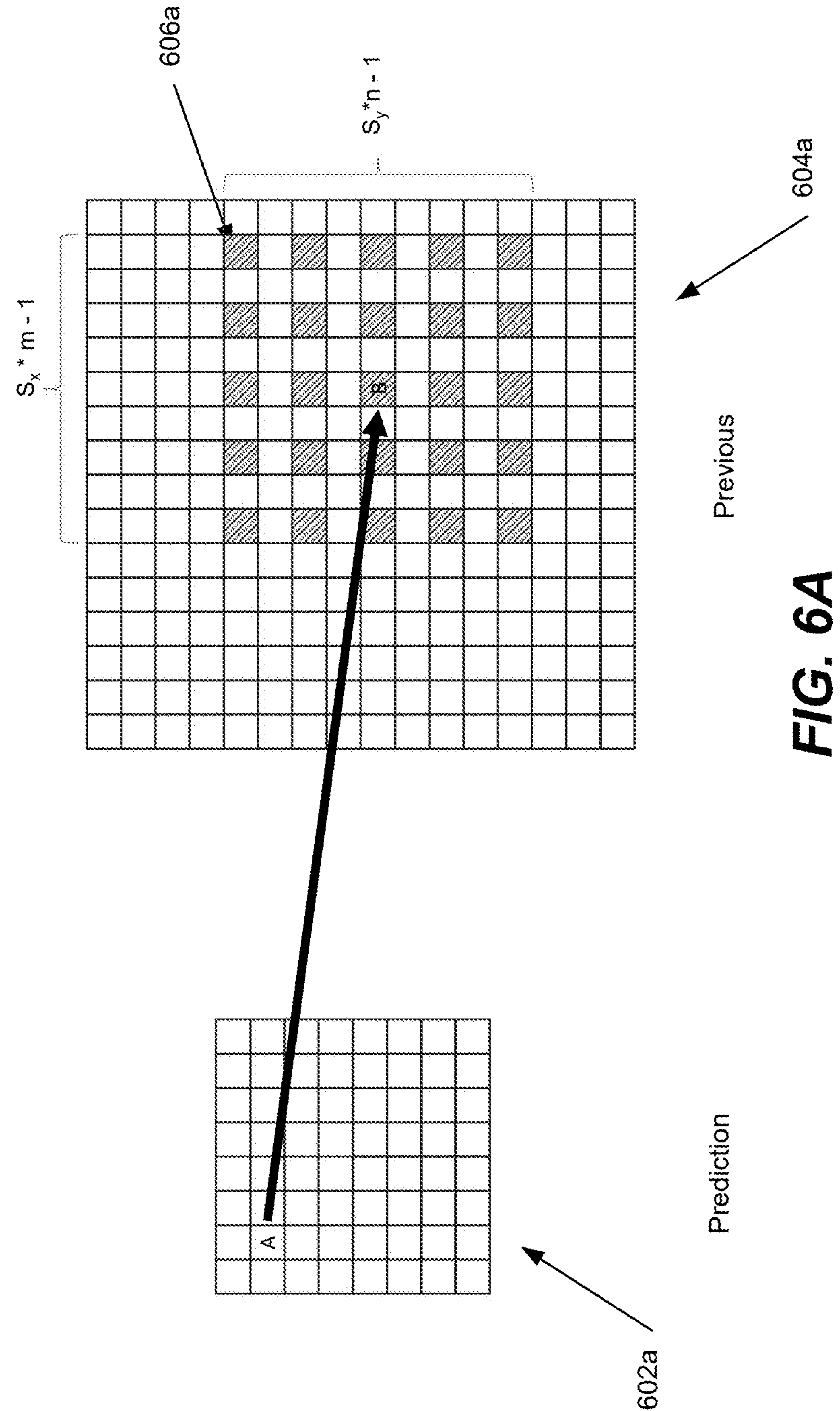
FIGS. 6A-E illustrate examples of determining translational motion compensation based on non-adjacent samples.

FIG. 6A illustrates the determination of prediction values across frames having different resolutions using sub-pel accuracy. The value for a location A in a predicted frame 602*a* is determined by cross-hatched samples 606*a* in the previously decoded frame 604*a*. In some embodiments, the location of the non-adjacent samples used for prediction may depend on the scaling ratio parameters (e.g., Sx and/or Sy). For example, in FIG. 6A, Sx and Sy equal 2, resulting in using non-adjacent samples from a 9×9 block of samples.

In some embodiments, equation 10 may be referred to as a strided convolution or a strided filter, where the stride length in a dimension is a scaling factor in that dimension between the previous frame and the predicted frame. As the scaling factor increases, the stride length increases. Notably, if Sx does not equal Sy, then the stride length in the x and y dimensions will also not be equal.

A strided convolution or strided filter as described herein describes a convolution wherein the selection of samples of a previous frame for convolution is strided in addition to a stride of the filter as it slides across a frame for determining values in a predicted frame. A strided filter may be implemented in various ways known in the art. For example, comparing equations 10 and 2, the scaling factors Sx and Sy are applied to i and j, respectively, in equation 10, resulting in sampling elements surrounding a location B of the previous frame based on the scaling factor. In some embodiments, a strided filter may be a filter having a size of $Sy*n-1\times Sx*m-1$, where the filter has nonzero weights for elements Sx*i and Sy*j, where i is equal to all integer values in the range of −m/2 to m/2, j is equal to all integer values in the range −n/2 to n/2, and zero weights elsewhere. In various embodiments described herein, the cross-hatched samples 606*a* are used for filtering to determine a value for location A, and these samples may be selected based on the scaling factors between the prediction frame and the previous frame by various methods understood in the art.

In one embodiment, the location B corresponds to the integer value of the scaled motion vector. This is expressed as $$Bx=\mathrm{round}(Sx*(Ax+mvx)) \quad \text{EQ. 11}$$

$$By=\mathrm{round}(Sy*(Ay+mvy)) \quad \text{EQ. 12}$$

where Ax and Ay are respectively the horizontal and vertical coordinates of A, Bx and By are respectively the horizontal and vertical coordinates of B, and round(x) is an operation that returns the integer component closest to the value x.

Figure 6B:
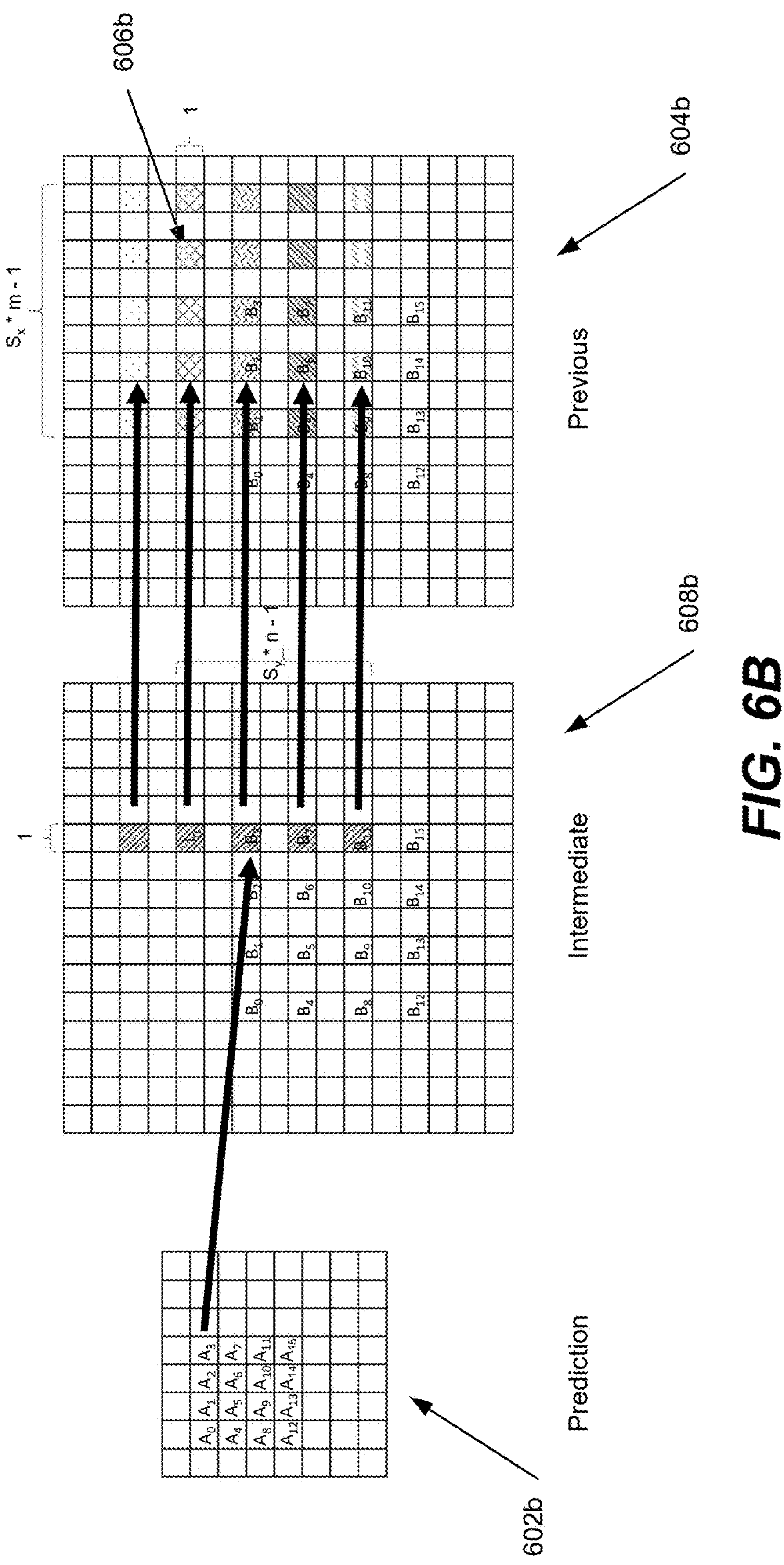

In some embodiments, the filtering operation is a separable filtering operation. FIG. 6B illustrates separable filtering operations. Prediction of the sample at location A3 in a current frame 602*b* is determined with a separable filtering operation. The first step of the separable operation determines an intermediate frame 608*b* by applying a one-dimensional filtering operation to the previously decoded frame 604*b*, which in the example of FIG. 6B is a horizontal filtering operation. In this example, the intermediate location I0 is determined by performing a filtering operation using the non-adjacent samples 606*b* denoted with the 'x' cross-hatch in the previously decoded frame and a one-dimensional filter with width m and height equal to one. Similarly, the intermediate location B7 is determined from the non-adjacent samples in the region denoted by the down-left cross hatch. The value of the sample at location A3 is then determined by performing another one-dimensional filtering operation in the perpendicular dimension using the intermediate values denotes with the down-right cross-hatch and a filter with height n and width equal to one. In some embodiments, the distance between non-adjacent samples is determined by the scaling ratio parameters (e.g Sx and/or Sy). While FIG. 6B is shown as performing a horizontal filtering operation prior to a vertical filtering operation, the opposite order may also be performed. I.e., a vertical filtering operation is performed prior to a horizontal filtering operation.

Figure 6C:
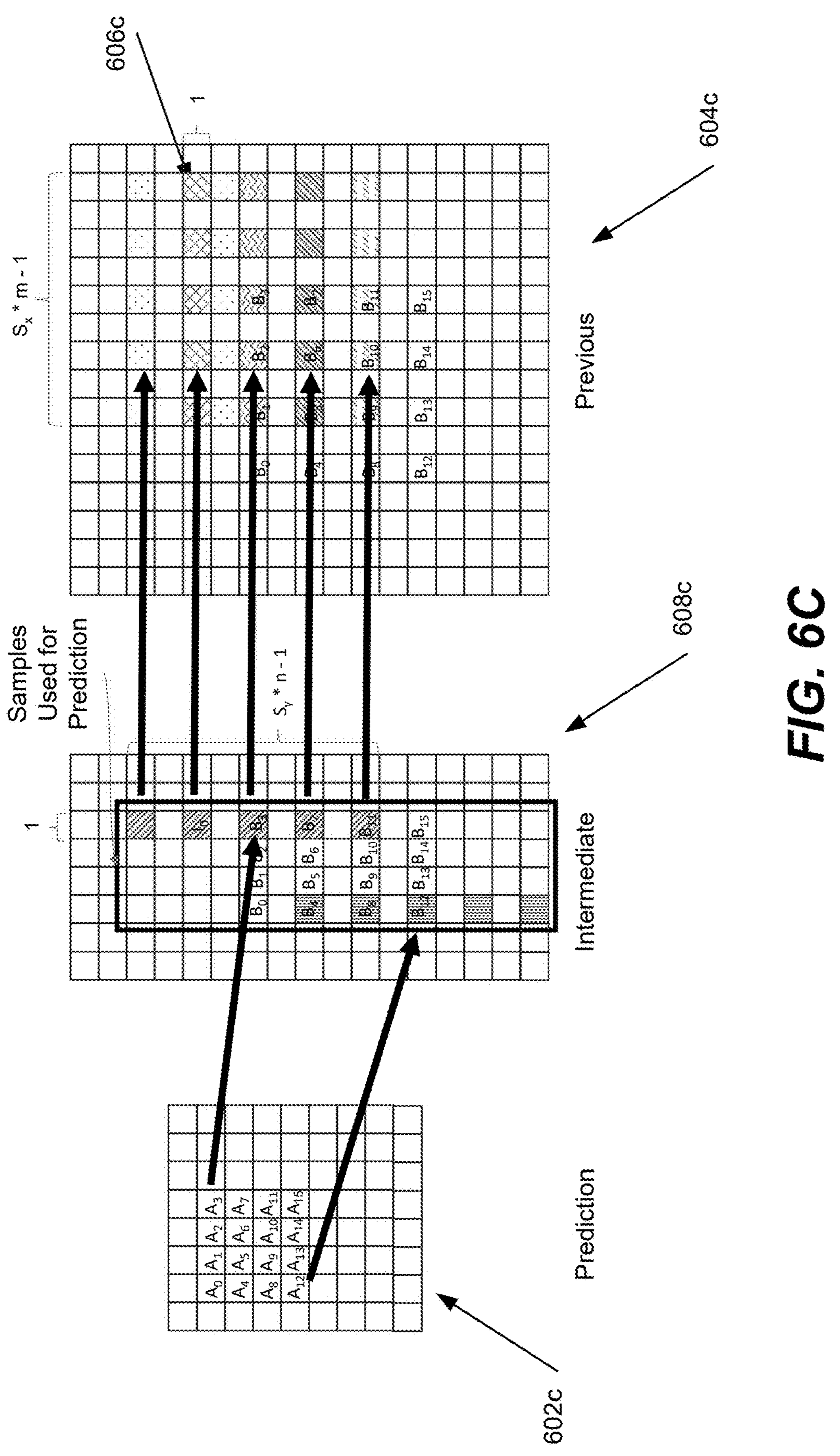

Another example is shown in FIG. 6C. In FIG. 6C, prediction for the sample locations A0, A1, . . . , A14, A15 in a current frame 602*c* are determined using a separable filtering operation and using the same motion vector for all locations. The first step of the separable operation determines an intermediate frame 608*c* by applying a horizontal filtering operation and decimation operation to a previously decoded frame 604*c*. For example, the value at intermediate location I0 is determined by performing a filtering operation using the non-adjacent samples 606*c* denoted with the 'x' cross-hatch in the previously decoded frame and a filter with width m and height equal to one. Similarly, the value at intermediate location B7 is determined using non-adjacent samples from the region denoted by the down-left cross hatch. The value of the sample at location A3 is then determined by performing a filtering operation using the intermediate and non-adjacent values from the region denoted with the down-right cross-hatch and a filter with height n and width equal to one. Other prediction samples are also determined from the samples in the intermediate frame 608*c*. For example the sample at location A12 is determined from the non-adjacent samples in the previous frame denoted with the vertical cross-hatch mark.

One benefit of the separable filtering operation shown in FIG. 6C is reduced complexity. The separable filtering operation first determines an intermediate frame by a horizontal filtering operation. Samples in this intermediate frame are then used to determine the set of predicted samples using a vertical filtering operation. In this example, the number of multiplies required to determine the prediction from the previous frame is expressed as:

$$\mathrm{NumberOfMultiplies}=\mathrm{NumberOfPredictedSamples}*n+\mathrm{NumberOfSupportRegionSamples}*m \quad \text{EQ. 12}$$

where the NumberOfPredictedSamples is the number of samples in the set of predicted samples using the same motion vector, and the NumberOfSupportRegionSamples is the number of samples in the intermediate frame that are needed for prediction. Fewer than all samples in the support region are needed to determine the predicted sample values due to the use of non-adjacent samples for the vertical filtering operation. The resulting number of needed samples can be expressed as:

$$\mathrm{NumberOfSupportRegionSamples}=\mathrm{BlockSizex}*(\mathrm{BlockSizey}+n-1) \quad \text{EQ. 13}$$

where BlockSizex and BlockSizey are the width and height of the set of predicted samples.

In some implementations, where the width and height of the set of predicted samples are both 4, Sx is equal to 2, Sy is equal to 2, m is equal to 5 and n is equal to 5, we see that the number of multiplies to compute the set of predicted samples is 240. Notably, the complexity does not depend on the scaling ratio parameters. For example, if the width and height of the set of predicted samples are both 4, Sx is equal to 3, Sy is equal to 3, m is equal to 5 and n is equal to 5, the number of multiplies is also equal to 240.

Figure 6D:
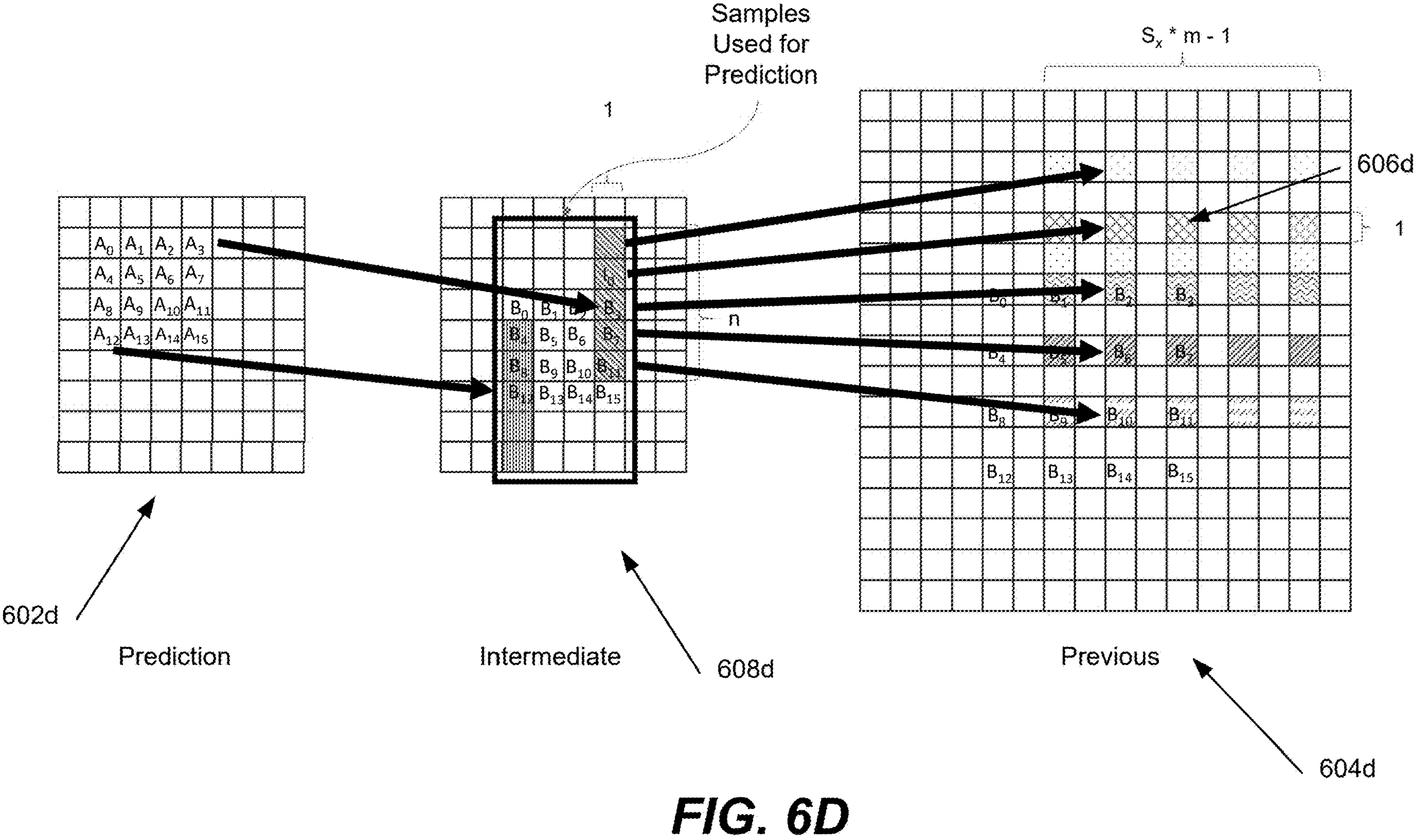

FIG. 6D presents another example embodiment for prediction of sample locations in a predicted frame 602*d* using the same motion vector for all locations. FIG. 6D differs from FIG. 6C in that decimation for the intermediate frame is performed in the vertical dimension in addition to the horizontal dimension. The first step of the separable operation determines an intermediate frame 608*d* by applying a horizontal filtering operation and decimation operation to a previously decoded frame 604*d*. Additionally, since non-adjacent samples will be used for the subsequent vertical filter, only the samples corresponding to these non-adjacent samples are stored. As in previous examples, the value at intermediate location I0 is determined by performing a filtering operation using the non-adjacent samples 606*d* denoted with the 'x' cross-hatch in the previously decoded frame and a filter with width m and height equal to one. Similarly, the value at intermediate location B7 is determined from the region using the non-adjacent samples denoted by the down-left cross hatch. The value of the sample at location A3 is then determined by performing a filtering operation using the intermediate and now adjacent values denoted with the down-right cross-hatch and a filter with height n and width equal to one. Other prediction samples are also determined from the samples in the intermediate frame. For example the sample at location A12 is determined from the now adjacent samples in the previous frame denoted with the vertical cross-hatch mark.

The separable filtering operation shown in FIG. 6D has the benefit of reducing the amount of memory required to store the intermediate values. Samples that are not used for filtering, e.g., adjacent samples, may not be stored, reducing memory requirements compared to storing all samples or intermediate values. Additionally, the second filtering operation (e.g. the vertical filtering operation) does not depend on the scaling ratio parameters.

Figure 6E:
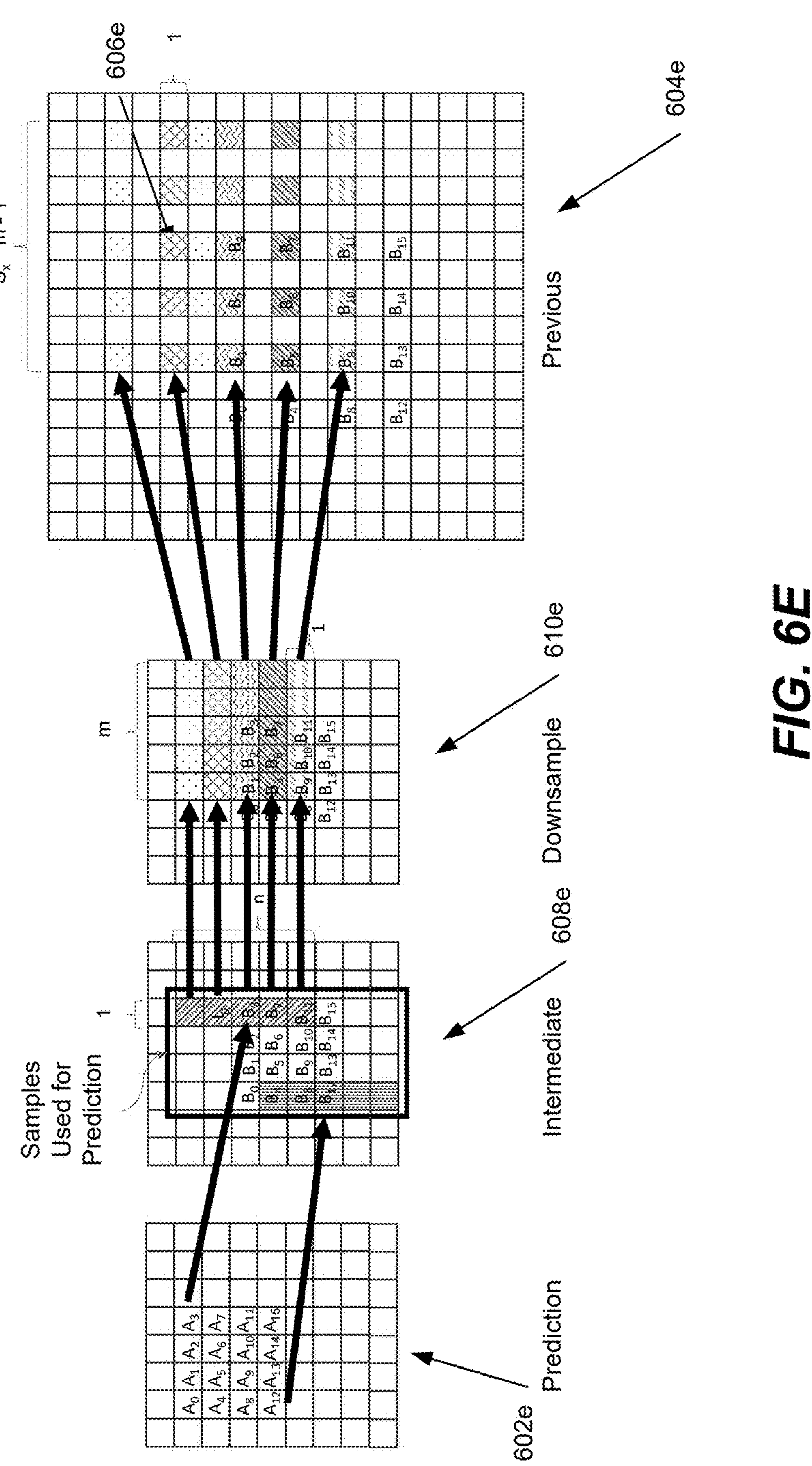

Another example method is shown in FIG. 6E. In FIG. 6E, prediction for the sample locations A0, A1, . . . , A14, A15 in a current frame 602*e* is determined with a separable filtering operation and using the same motion vector for all locations. The first step of the separable operation applies a downsampling operation to a previous frame 604*e* to determine a downsampled frame 610*e*. The decimation process may copy the non-adjacent sample locations used by the horizontal and vertical filtering operations. In some embodiments, a downsampling operation may downsample a previous frame based on a scaling ratio between a previous frame and a prediction frame. The downsampled frame may then have the same size as the prediction frame.

An intermediate frame 608*e* is then determined by applying a horizontal filtering operation to the downsampled frame. For example, the value at intermediate location I0 is determined by performing a filtering operation using the samples 606*e* denoted with the 'x' cross-hatch and a filter with width m and height equal to one. Similarly, the value at intermediate location B7 is determined from the region using the samples denoted by the down-left cross hatch. The value of the sample at location A3 is then determined by performing a filtering operation using the intermediate values denoted with the down-right cross-hatch and a filter with height n and width equal to one. Other prediction samples are also determined from the samples in the intermediate frame 608*e*. For example the sample at location A12 is determined from the samples in the previous frame 604*e* denoted with the vertical cross-hatch mark.

An advantage of the processes shown in FIGS. 6A-E is the efficient reuse of pixel values for scaled frames. Using non-adjacent samples for filtering operations based on a scaling ratio allows for samples to be reused for more predictions, particularly compared to the embodiments shown in FIGS. 5A-E. This is in part due to the scaling ratio affecting the use of non-adjacent samples in a previous frame. As the location B in the previous frame corresponds to the scaled motion vector, locations B0-B15 may be non-adjacent. Using non-adjacent samples based on scaling factors between the previous frame and the predicted frame will cause more samples to be reused for filtering operations, improving efficiency.

For example, as shown in FIG. 5C, a 5×5 block of pixels centered on B3 may be filtered to generate a pixel value for A3, however, the pixels above the row of B0-B3 may only be used for coding of pixels A0-A3. The row of pixels for A4-A7 will be generated from 5×5 blocks of pixels centered on B4-B7, respectively, and thus will not use any pixel values above pixels B0-B4. This may be compared with FIG. 6B, where non-adjacent samples are used. Here, the "x" cross-hatched samples may be used for filtering operations to determine values A0-A7. This improves efficiency, particularly in the embodiments shown in FIGS. 6D and 6E, where samples that are not used for any filtering operations may be skipped for determining intermediate or downsampled frames, improving efficiency and memory storage.

This advantage may be further understood by the discussion above on the number of multiplies to determine predictions. Embodiments herein may use the scaling ratio to determine which samples to use for filtering operations in a manner that makes the number of multiplies independent of the scaling ratio. This may be advantageous over embodiments where the number of multiplies is dependent on the scaling ratio, e.g., the embodiments shown in FIGS. 5A-E. In various embodiments herein, the scaling ratio may be 2, 3, 4, 5, or 6. In some embodiments, a scaling ratio is the same in x and y dimensions. In some embodiments, two different scaling ratios are used: Sx and Sy. Sx and Sy may be any scaling ratio disclosed herein.

Figure 7:
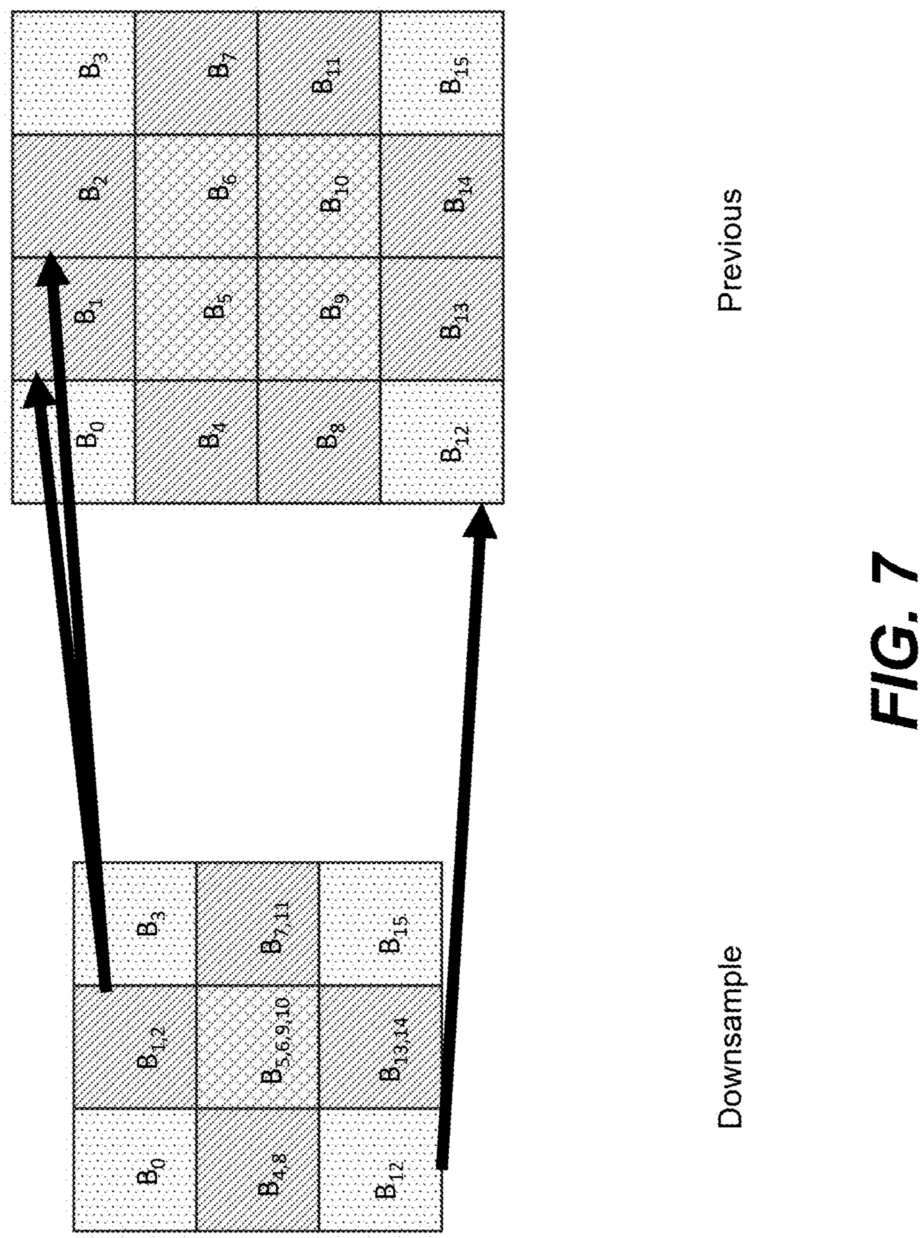
FIG. 7 illustrates an example of downsampling.

In some embodiments, a scaling ratio may be a non-integer value, e.g., 1.5. In such embodiments, a downsampling process may be used to generate a downsampled frame which may then be used for determining values in a predicted frame. FIG. 7 illustrates an example embodiment for downsampling. The downsampling process shown in FIG. 7 is based on values for Sx and Sy that are equal to 1.5. The downsampled locations Ba,b are determined from the values at locations Ba and Bb in the previously decoded frame, e.g., B1,2 are determined from locations B1 and B2. Similarly, the downsampled location Ba,b,c,d are determined from the values at locations Ba, Bb, Bc, and Bd. In some embodiments, this determination is an averaging operation. Other downsampling operations may be used as known by those of skill in the art. The downsampled frame may then be used for determining a prediction frame, including the determination of an intermediate frame as described above in reference to FIG. 6E.

As described above, a translational motion compensation process that uses sub-pel motion accuracy may use a filtering operation to determine a value for the sub-pel location. In some embodiments, this process consists of two steps. The first step is to determine a location in the previous frame that corresponds to the location to be predicted. The second step is to determine the filter used for the filtering operation.

In some examples, the step of determining the location in the previous frame may be expressed as:

$$Bx=\text{round}(Sx*(Ax+mvx)) \quad \text{EQ. 14}$$

$$By=\text{round}(Sy*(Ay+mvy)) \quad \text{EQ. 15}$$

where Ax and Ay are respectively the horizontal and vertical coordinates of a location to be predicted, Bx and By are respectively the horizontal and vertical coordinates of the corresponding location in the previous frame, and round(x) is an operation that returns an integer value closest to x. Additionally, in some embodiments, the filter used for the filtering operation may be determined from the horizontal phase and vertical phase information expressed as:

$$\text{Phasex}=\text{fraction}(Sx*(Ax+mvx))*(1/\text{Motion VectorAccuracy}) \quad \text{EQ. 16}$$

$$\text{Phasey}=\text{fraction}(Sx*(Ax+mvy))*(1/\text{Motion VectorAccuracy}) \quad \text{EQ. 17}$$

where Motion VectorAccuracy is the precision of the sub-pel accuracy, and fraction(x) is an operation that returns the fractional component of the value x.

In some embodiments, the step of determining the location in the previous frame may be expressed as:

$$Bx=Sx*(Ax+\text{integer}(mvx)) \quad \text{EQ. 18}$$

$$By=Sy*(Ay+\text{integer}(mvy)) \quad \text{EQ. 19}$$

where Ax and Ay are respectively the horizontal and vertical coordinates of a location to be predicted, Bx and By are respectively the horizontal and vertical coordinates of the corresponding location in the previous frame, and integer (x) is an operation that returns an integer portion of x. For example, integer (5.75) may equal 5.

In some embodiments, the filter used for the filtering operation may be determined from the horizontal phase and vertical phase information expressed as:

$$\text{Phasex}=\text{fraction}(mvx)*(1/\text{Motion VectorAccuracy}) \quad \text{EQ. 20}$$

$$\text{Phasey}=\text{fraction}(mvy)*(1/\text{Motion VectorAccuracy}) \quad \text{EQ. 21}$$

where Motion VectorAccuracy is the precision of the sub-pel accuracy, and fraction(x) is an operation that returns the fractional component of the value x. One benefit of equations 20 and 21 it that Phasex and Phasey do not depend on the scaling ratio parameter values. In some implementations, this allows the translational motion prediction operation to use the same filters independent of the scaling ratio.

Figure 8A:
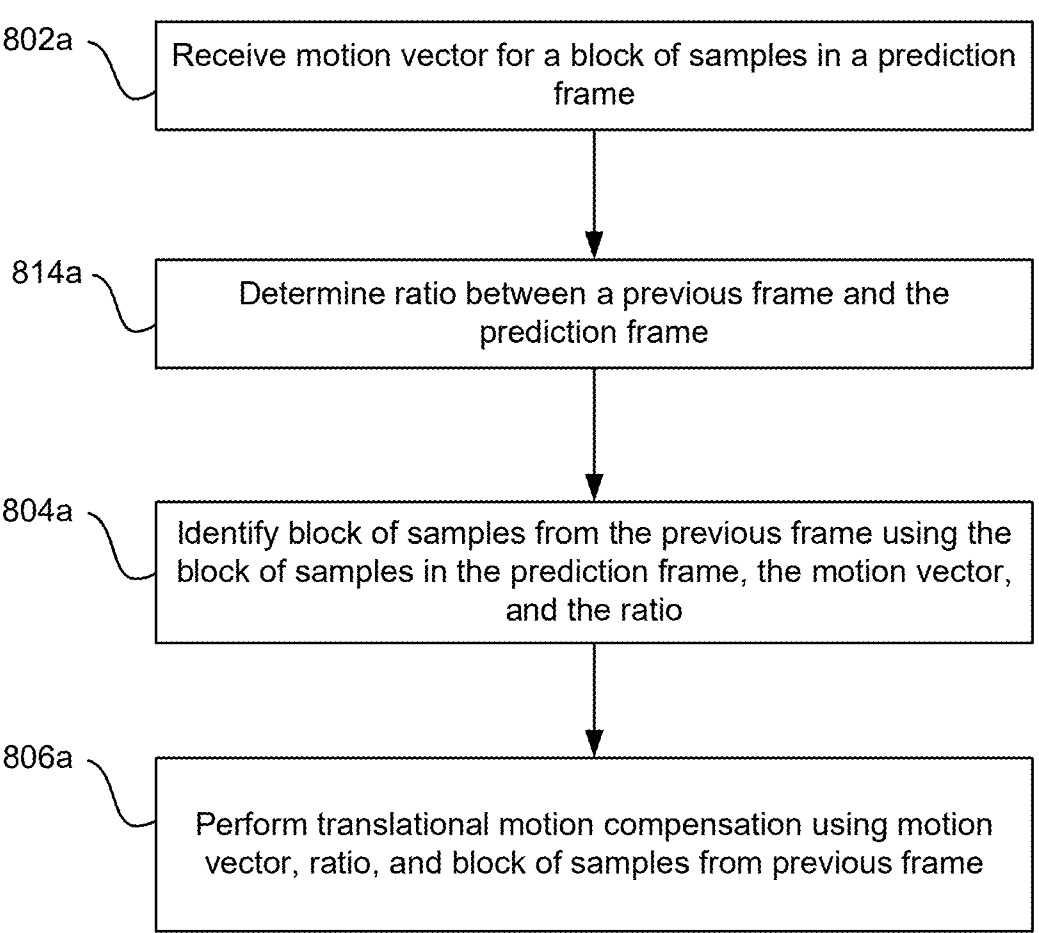
FIGS. 8A-B illustrate example process flowcharts for performing translational motion compensation.
Figure 8B:
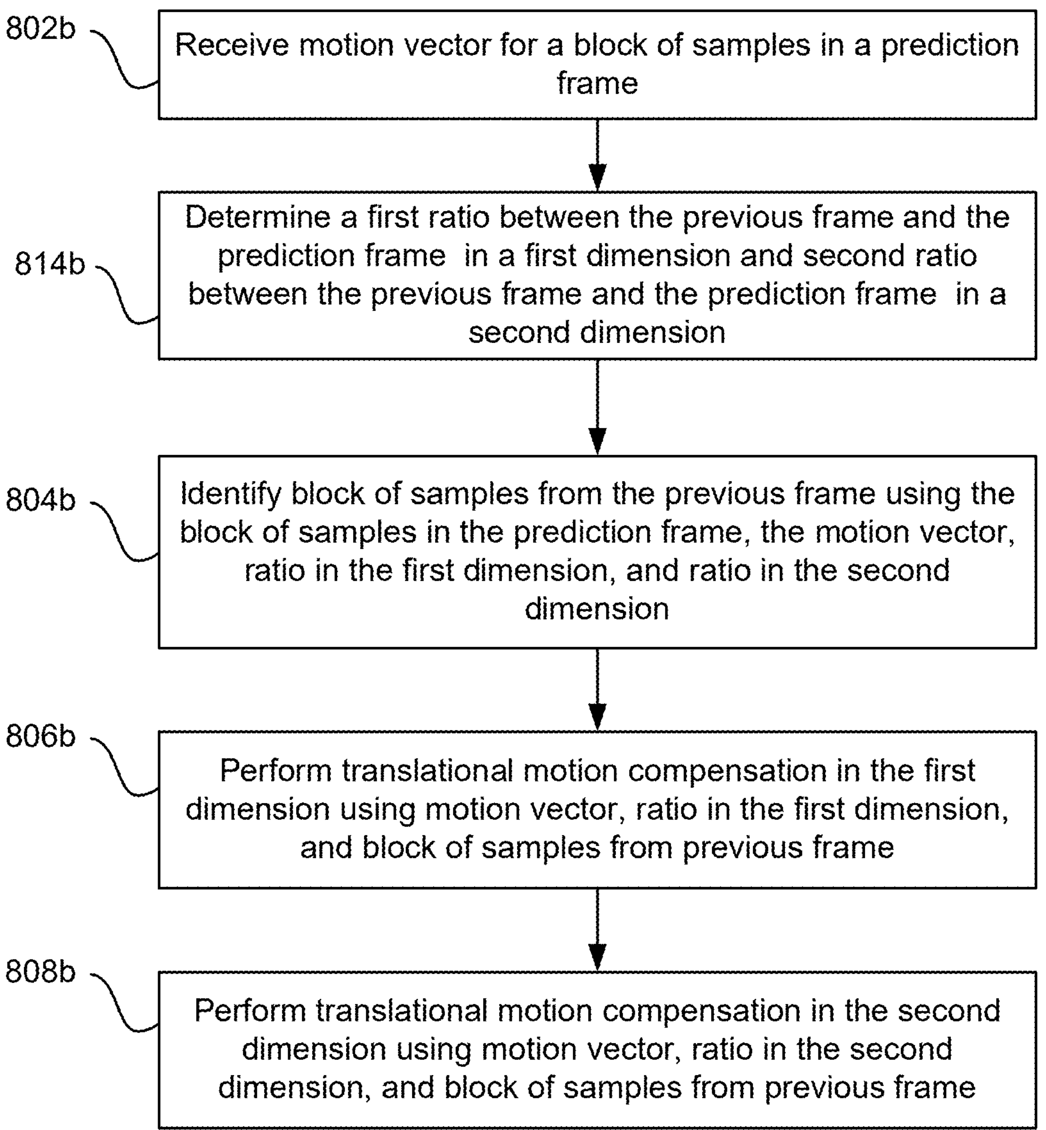

FIGS. 8A and 8B illustrate different process flowcharts for performing translational motion compensation as described herein. In FIG. 8A, a motion vector for a block of samples in a prediction frame is received (802*a*). In some embodiments, the motion vector applies to each location in the block of samples. A ratio between a previous frame and the prediction frame is determined (814*a*). In some embodiments, the ratio is greater than 1, e.g., 1.5, 2, 3, 4, 6, etc. A block of samples from the previous frame is identified using the block of samples in the prediction frame, the motion vector, and the ratio (804*a*). In some embodiments, the size of the block of samples from the previous frame is larger than the size of the block of samples in the prediction frame by a factor of the ratio. The block of samples in the prediction frame is then coded using a translational motion compensation process based on the motion vector, ratio and the block of samples of the previous frame (806*a*). A translational motion compensation process may comprise various operations described herein. In some embodiments, non-adjacent samples of the block of samples from the previous frame are used. In some embodiments, a downscaling operation is performed based on the ratio to generate a scaled block having the same dimensions as the block of samples in the prediction frame.

In FIG. 8B, a motion vector for a block of samples in a prediction frame is received (802*b*). In some embodiments, the motion vector applies to each location in the block of samples. A ratio between a previous frame and the prediction frame is determined in a first dimension and a second dimension, e.g., a horizontal and vertical dimension (814*b*). In some embodiments, the ratio in at least one dimension is greater than 1, e.g., 1.5, 2, 3, 4, 6, etc. A block of samples from the previous frame is identified using the block of samples in the prediction frame, the motion vector, the ratio in the first dimension, and the ratio in the second dimension (804*b*). In some embodiments, the size of the block of samples from the previous frame is larger than the size of the block of samples in the prediction frame by a factor of the ratio in each dimension. The block of samples in the prediction frame is then coded using a translational motion compensation process based on the motion vector, ratio and the block of samples of the previous frame. The block of samples in the prediction frame is coded in the first dimension based on the ratio in the first dimension (806*b*). The block of samples in the prediction frame is then coded in the second dimension based on the ratio in the second dimension (808*b*). A translational motion compensation process may comprise various operations described herein. In some embodiments, non-adjacent samples of the block of samples from the previous frame are used. In some embodiments, a downscaling operation is performed based on the ratio to generate a scaled block having the same dimensions as the block of samples in the prediction frame.

Affine Transformation

As noted above, inter frame prediction may be expressed as:

$$\text{Prediction}(x,y)=\text{Previous}(x+mvx,y+mvy) \quad \text{EQ. 22}$$

where Prediction(x,y) denotes a sample in the current coding block, Previous(x, y) denotes a sample in the previously decoded frame, x denotes a horizontal location, y denotes a vertical location, (mvx, mvy) denotes a motion vector, mvx denotes a horizontal component of the motion vector, and mvy denotes a vertical component of the motion vector. As previously described, one or more of the motion vectors may be expressed with a sub sample precision (e.g. 1/8 pixel motion vector accuracy). In some embodiments, the sample value at these locations may be determined by interpolating the values of neighboring sample values.

Affine motion compensation accounts for shearing, scaling, rotating and changes in aspects ratios when predicting a sample in a current frame from one or more samples in a previously decoded frame. In some embodiments, this shearing, scaling, rotating and other changes may be expressed as:

$$mvx=(mv1x-mv0x)*x/d1,0+(mv1y-mv0y)*y/d1,0+mv0x \quad \text{EQ. 23}$$

$$mvy=(mv1y-mv0y)*x/d1,0+(mv1x-mv0x)*y/d1,0+mv0y \quad \text{EQ. 24}$$

where (mv0x, mv0y) is a motion vector that corresponds to a first control point, (mv1x, mv1y) is a motion vector that corresponds to a second control point, and d1,0 is the distance between the first and second control points. Note that mvx and mvy change in response to the horizontal location denoted by x and the vertical location denoted by y.

Figure 9A:
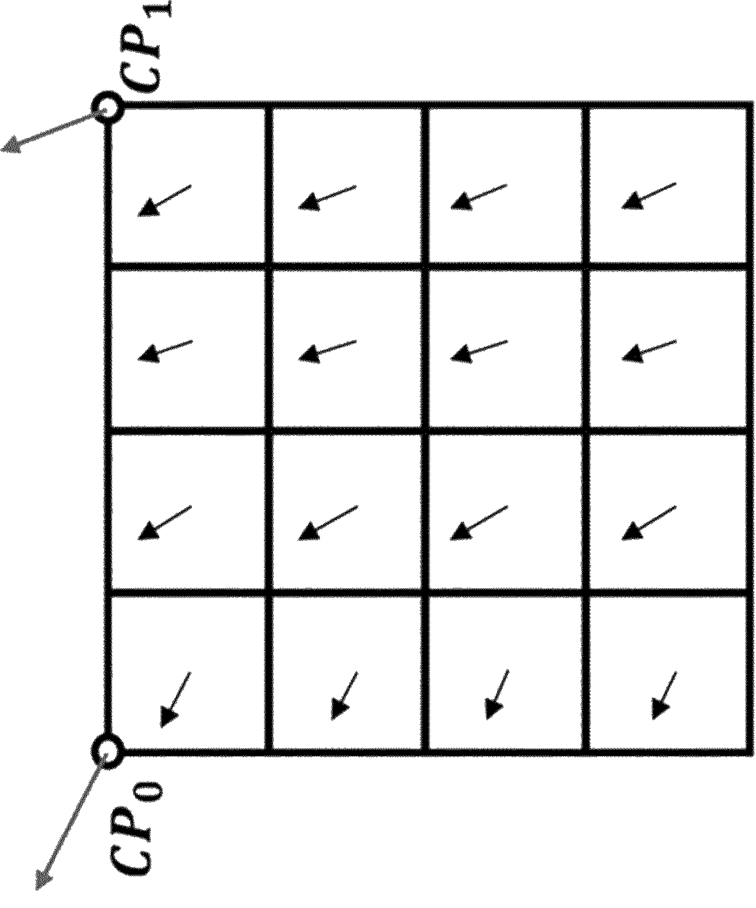
FIGS. 9A-B illustrate examples of control points for affine motion compensation.

An example of affine motion compensation is shown in FIG. 9A. A first control point (CP) may correspond an upper-left location of a current coded block (e.g $CP_0$). A second control point may correspond to an upper-right location of the current block (e.g. $CP_1$). Each control point may have an associated motion vector. The motion vector for a sample location in the block is determined in response to the motion vectors at the first and second control point. The resulting motion vectors may differ depending on the horizontal and vertical location in the current coding block. In FIG. 9A, d1,0 is equal to the width of the current coded block.

Figure 9B:
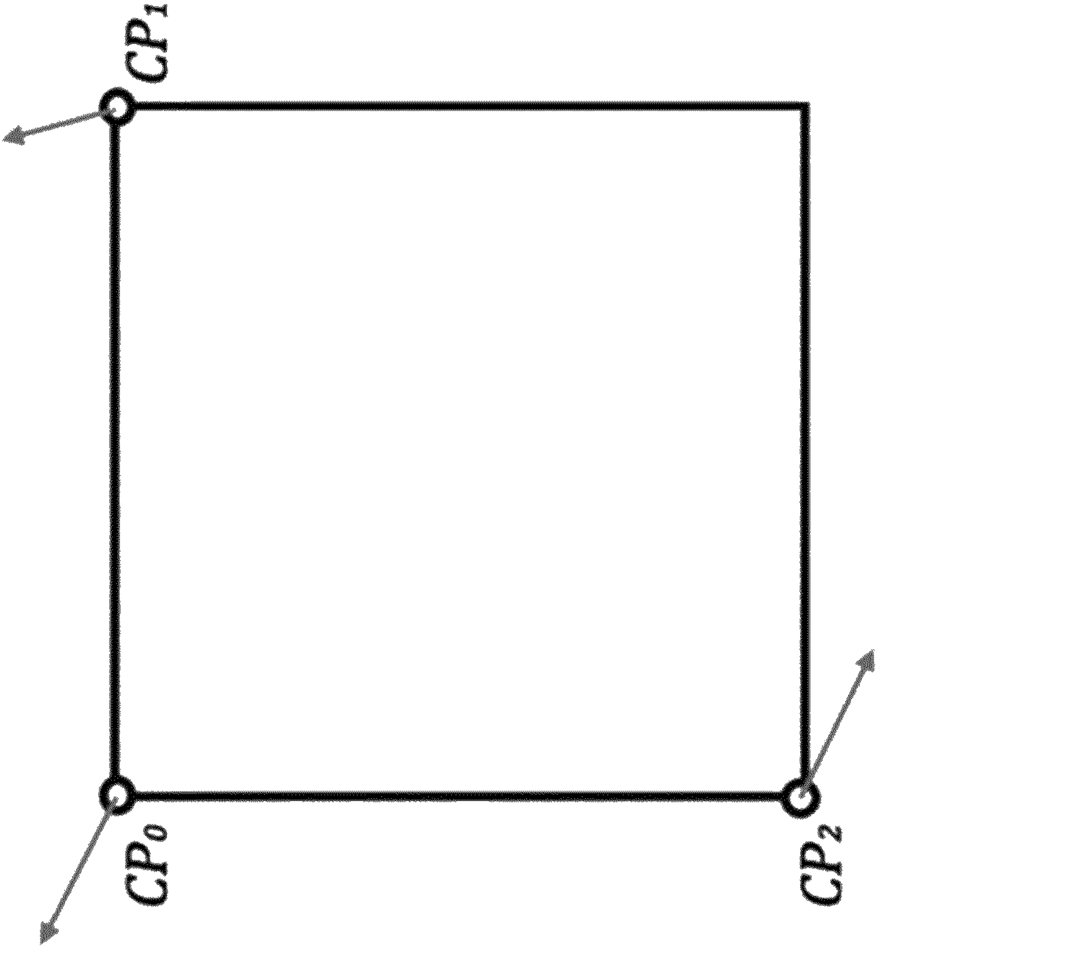

In some embodiments, different control points may be used. For example, the shearing, scaling, rotating and other changes may be expressed as:

$$mvx=(mv1x-mv0x)*x/d1,0+(mv2y-mv0y)*y/d2,0+mv0x \quad \text{EQ. 25}$$

$$mvy=(mv1y-mv0y)*x/d1,0+(mv2x-mv0x)*y/d2,0+mv0y \quad \text{EQ. 26}$$

where (mv2x, mv2y) is a motion vector that corresponds to a third control point. Another example is shown in FIG. 9B. In FIG. 9B, the third control point corresponds to the bottom-left of the current coded block (e.g $CP_2$). In this example, d1,0 is equal to the width of the current coded block and d2,0 is equal to the height of the current coded block. Additional control points may also be defined in various embodiments disclosed herein.

In some embodiments, the shearing, scaling, rotating and other changes may be expressed as:

$$mvx=a*x+b*y+mv0x \quad \text{EQ. 27}$$

$$mvy=c*x+d*y+mv0y \quad \text{EQ. 28}$$

where a, b, c and d correspond to parameters of an affine transform. As described above, these parameters may be determined by one or more control points. For example, the parameters could be expressed as:

$$a=(mv1x-mv0x)/d1,0 \quad \text{EQ. 29}$$

$$b=(mv2y-mv0y)/d2,0 \quad \text{EQ. 30}$$

$$c=(mv1x-mv0x)/d1,0 \quad \text{EQ. 31}$$

$$d=(mv2y-mv0y)/d2,0 \quad \text{EQ. 32}$$

Other relationships are also possible. In some embodiments, these parameters may also be determined from information in a bit-stream.

In some embodiments, affine motion compensation may use a two-step process to determine a prediction. A first step may be expressed as:

$$\text{Buffer}(x,y)=\text{Previous}(x+\text{mvxa},y+\text{mvya}) \quad \text{EQ. 33}$$

where Buffer(x,y) denotes a sample in a buffer, e.g., a buffer frame or intermediate frame, and (mvxa, mvya) denotes a motion vector. The second step may be expressed as:

$$\text{Prediction}(x,y)=\text{Buffer}(x+\text{mvxb},y+\text{mvyb}), \quad \text{EQ. 34}$$

where (mvxb, mvyb) denotes a motion vector. In some embodiments, the motion vectors may be expressed as:

$$\text{mvxa}=(1+\text{alpha})*x+\text{beta}*y+mv0x \quad \text{EQ. 35}$$

$$\text{mvya}=0*x+1*y+mv0y \quad \text{EQ. 36}$$

and $$\text{mvxb}=1*x+0*y+mv0x \quad \text{EQ. 36}$$

$$\text{mvyb}=\text{gamma}*x+(1+\text{delta})*y+mv0y \quad \text{EQ. 38}$$

where alpha, beta, gamma and delta correspond to parameters of an affine transformation. In some embodiments, these parameters may be related to a single step process with the relationships:

$$a=1+\text{alpha} \quad \text{EQ. 39}$$

$$b=\text{beta} \quad \text{EQ. 40}$$

$$c=(1+\text{alpha})*\text{gamma} \quad \text{EQ. 41}$$

$$d=\text{beta}*\text{gamma}+1+\text{delta} \quad \text{EQ. 42}$$

A two step process may reduce the complexity of determining the affine motion compensation prediction. In some embodiments, this implementation efficiency is due to mvya not being responsive to the horizontal dimension (e.g. the value x is multiplied by zero), and mvxb not being responsive to the vertical dimension (e.g. the value y is multiplied by zero). Furthermore, in some embodiments an affine motion compensation process may limit the range of motion vectors to further reduce complexity. For example, in some embodiments the parameters gamma and delta may be limited so that mvyb is always in the range of mv0y−1 and mv0y+1. Similarly, the parameters alpha and beta may be limited so that mvxa is always in the range of mv0x−1 and mv0x+1. This limits the size of the interpolation filter in some embodiments.

Disclosed herein are methods, systems, and computer program products to perform affine motion compensation across different resolutions. In some embodiments, a ratio is determined between the current frame resolution and the resolution of the previous frame. In some embodiments, this ratio may be determined in the horizontal and vertical dimensions or only in one dimension, e.g., the vertical dimension.

The motion vector used for affine motion compensation may be expressed as:

$$mvx=a'*x+b'*y+Sx*mv0x \quad \text{EQ. 43}$$

$$mvy=c'*x+d'*y+Sy*mv0y \quad \text{EQ. 44}$$

where:

$$a'=Sx*a \quad \text{EQ. 45}$$

$$b'=Sy*b \quad \text{EQ. 46}$$

$$c'=Sx*c \quad \text{EQ. 47}$$

$$d'=Sy*d \quad \text{EQ. 48}$$

and where Sx is the ratio determined in the horizontal dimension and Sy is the ratio determined in the vertical dimension. Using the ratios as components of a motion vector may improve efficiency in determining affine compensation.

In some embodiments, a previously decoded frame having a different resolution than a predicted frame may first be converted to the predicted frame resolution. Then the affine motion compensation process may be expressed as:

$$\text{Prediction}(x,y)=\text{ScalePrevious}(x+mvx,y+mvy), \quad \text{EQ. 49}$$

where ScalePrevious denotes the result of scaling the previous coded frame by the scale factor Sx in the horizontal resolution and Sy in the vertical resolution. In some embodiments, the scaling operation is an upsampling, downsampling or resampling operation. In some embodiments, the scaling operation may be expressed as:

$$\text{ScalePrevious}(x,y)=\text{Sum\_}i,j\ \text{Coefficient}(i,j)*\text{Previous}(Sx*x+i,Sy*y+j) \quad \text{EQ. 50}$$

where Coefficient(i,j) is a filter coefficient, i is a filter coefficient horizontal offset, and j is a filter coefficient vertical offset.

In some embodiments, a previously decoded frame is converted to a current frame resolution as part of a two step process. The first step of the affine motion compensation operation may be expressed as:

$$\text{Buffer}(x,y)=\text{ScalePreviousA}(x+\text{mvxa},y+\text{mvya}) \quad \text{EQ. 51}$$

where ScalePreviousA denotes the result of downsampling the previous coded frame in the horizontal and vertical dimension by a scale factor of Ax and Ay, respectively. In one example, the motion vector used for affine motion compensation may be expressed as:

$$\text{mvxa}=(Sx*(1+\text{alpha})*x+Sy*\text{beta}*y+Sx*mv0x)/Ax \quad \text{EQ. 52}$$

$$\text{mvya}=(0*x+Sy*y+Sy*mv0y)/Ay \quad \text{EQ. 53}$$

and the downsampling operation may be expressed as:

$$\text{ScalePreviousA}(x,y)=\text{Sum\_}i,j\ \text{Coefficient1}(i,j)*\text{Previous}(Ax*x+i,Ay*y+j) \quad \text{EQ. 54}$$

where Coefficient1(i,j) are filter coefficients. The second step may be expressed as:

$$\text{Prediction}(x,y)=\text{ScaleBufferB}(x+\text{mvxb},y+\text{mvyb}) \quad \text{EQ. 55}$$

where ScaleBufferB denotes the result of downsampling Buffer in the horizontal and vertical dimension by a scale factor of Bx and By, respectively. In some embodiments, the motion vector used for affine motion compensation may be expressed as:

$$mvxb=(Sx*x+0*y+Sx*mv0x)/(Ax*Bx) \quad \text{EQ. 56}$$

$$mvyb=(Sx*gamma*x+Sy*(1+delta)*y+Sy*mv0y)/(Ay*By) \quad \text{EQ. 57}$$

and the downsampling operation may be expressed as:

$$ScaleBufferB(x,y)=Sum\_i,j\ Coefficient2(i,j)*Buffer(Bx*x+i,By*y+j) \quad \text{EQ. 58}$$

where Coefficient2(i,j) are filter coefficients. In some embodiments, the product of Ax and Bx is equal to Sx. In some embodiments, the product of Ay and By is equal to Sy.

In some embodiments, the complexity of the operation may be reduced by setting the parameters Ax=Sx, Ay=Sy, Bx=1, and By=1, respectively. In some embodiments, a previously decoded frame is converted to a current frame resolution as part of a two step process. The first step of the affine motion compensation operation may be expressed as:

$$Buffer(x,y)=ScalePrevious(x+mvxa,y+mvya) \quad \text{EQ. 59}$$

where ScalePrevious denotes the result of downsampling the previous coded frame in the horizontal and vertical dimension by a scale factor of Sx and Sy, respectively. In this embodiment, the motion vector used for affine motion compensation may be expressed as:

$$mvxa=(Sx*(1+alpha)*x+Sy*beta*y+Sx*mv0x)/Sx \quad \text{EQ. 60}$$

$$mvya=(0*x+Sy*y+Sy*mv0y)/Sy \quad \text{EQ. 61}$$

and the downsampling operation may be expressed as:

$$ScalePrevious(x,y)=Sum\_i,j\ Coefficient1(i,j)*Previous(Sx*x+i,Sy*y+j) \quad \text{EQ. 62}$$

where Coefficient1(i,j) are filter coefficients. The second step may not require further downsampling (and corresponds to Bx=1 and By=1). The motion vector used for affine motion compensation may be expressed as:

$$mvxa=x+0*y+mv0x \quad \text{EQ. 63}$$

$$mvya=gamma*x+(1+delta)*y+mv0y \quad \text{EQ. 64}$$

In some embodiments, the complexity of the operation may be reduced by setting the parameters Ax=Sx, Ay=1, Bx=1, and By=Sy, respectively. In some embodiments, a previously decoded frame is converted to a current frame resolution as part of a two step process. The first step of the affine motion compensation operation may be expressed as:

$$Buffer(x,y)=ScalePrevious(x+mvxa,y+mvya) \quad \text{EQ. 65}$$

where ScalePrevious denotes the result of downsampling the previous coded frame in the horizontal and vertical dimension by a scale factor of Sx and Sy, respectively. In this embodiment, the motion vector used for affine motion compensation may be expressed as:

$$mvxa=(Sx*(1+alpha)*x+Sy*beta*y+Sx*mv0x)/Sx \quad \text{EQ. 66}$$

$$mvya=0*x+Sy*y+Sy*mv0y \quad \text{EQ. 67}$$

and the downsampling operation may be expressed as:

$$ScalePrevious(x,y)=Sum\_i,j\ Coefficient1(i,j)*Previous(Sx*x+i,Sy*y+j) \quad \text{EQ. 68}$$

where Coefficient1(i,j) are filter coefficients. The second step may not require further downsampling (and corresponds to Bx=1 and By=1). The motion vector used for affine motion compensation may be expressed as:

$$mvxa=x+0*y+mv0x \quad \text{EQ. 69}$$

$$mvya=(Sx*gamma*x+Sy*(1+delta)*y+Sy*mv0y)/Sy \quad \text{EQ. 70}$$

As described above, in some embodiments an affine motion compensation process may limit the range of motion vectors to further reduce complexity. For example, the parameters gamma and delta may be limited so that mvyb is always in the range of mv0y−1 and mv0y+1. Similarly, the parameters alpha and beta may be limited so that mvxa is always in the range of mv0x−1 and mv0x+1. By setting the parameters Ax=Sx, Ay=1, Bx=1, and By=Sy, these limitations may be preserved in the presence of a scaling operation. This limits the size of the interpolation filter in some applications. This may reduce complexity by reducing the range of samples used for affine compensation which may otherwise be increased by the scaling factor.

Figure 10:
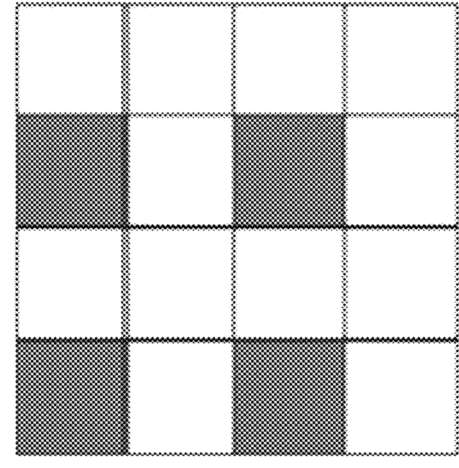
FIG. 10 illustrates another example of downsampling.
Figure 10:
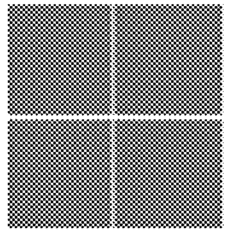

In another embodiment, the complexity of the affine motion compensation process may be further reduced by using a decimation operation as a downsampling operation. Here, a decimation operation may be defined as:

$$ScalePrevious(x,y)=Previous(Sx*x,Sy*y) \quad \text{EQ. 71}$$

where Sx*x and Sy*y are integer values. An example of a decimation operation is shown in FIG. 10. FIG. 7 also illustrates a downsampling process when Sx and Sy are equal to 1.5. The downsampled locations Ba,b are determined from the values at locations Ba and Bb in the previously decoded frame. Similarly, the downsampled location Ba,b,c,d are determined from the values at locations Ba, Bb, Bc, and Bd. In some embodiments, this determination is an averaging operation.

Figure 11A:
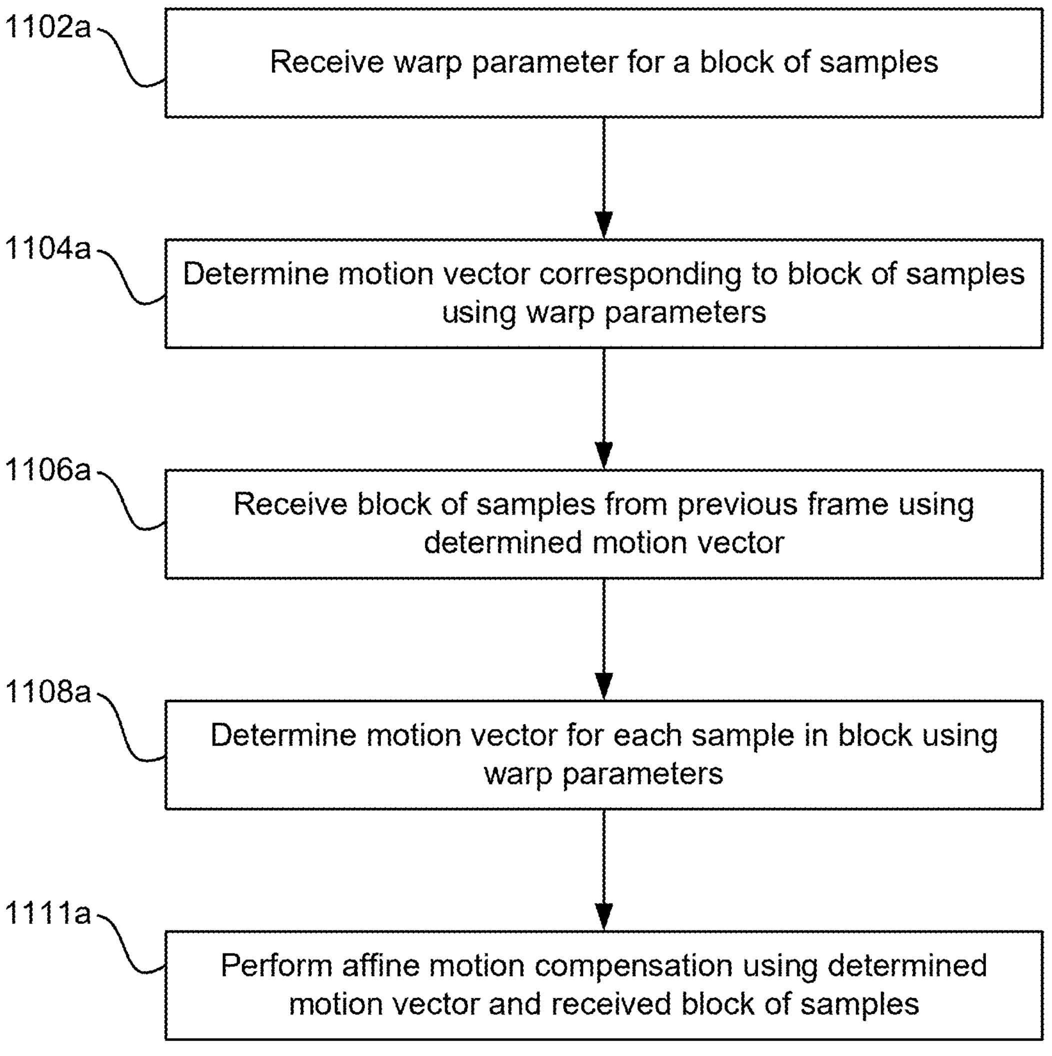
FIGS. 11A-D illustrate examples of processes for performing affine motion compensation.

One example of a reduced complexity affine motion compensation process is shown in FIG. 11A. Warp parameters are received for a block of samples as input (1102*a*). An initial motion vector (e.g. mvx3, mvy3) for the block of samples is determined using the warp parameters (1104*a*). A block of samples from the previous frame are determined using the initial motion vectors (1106*a*). The warp parameters are then used to determine a motion vector for each sample in the block relative to the initial motion vector (1108*a*). These relative motion vectors are used to create a prediction for each block by performing affine motion compensation and the received block of samples (1111*a*).

Figure 11B:
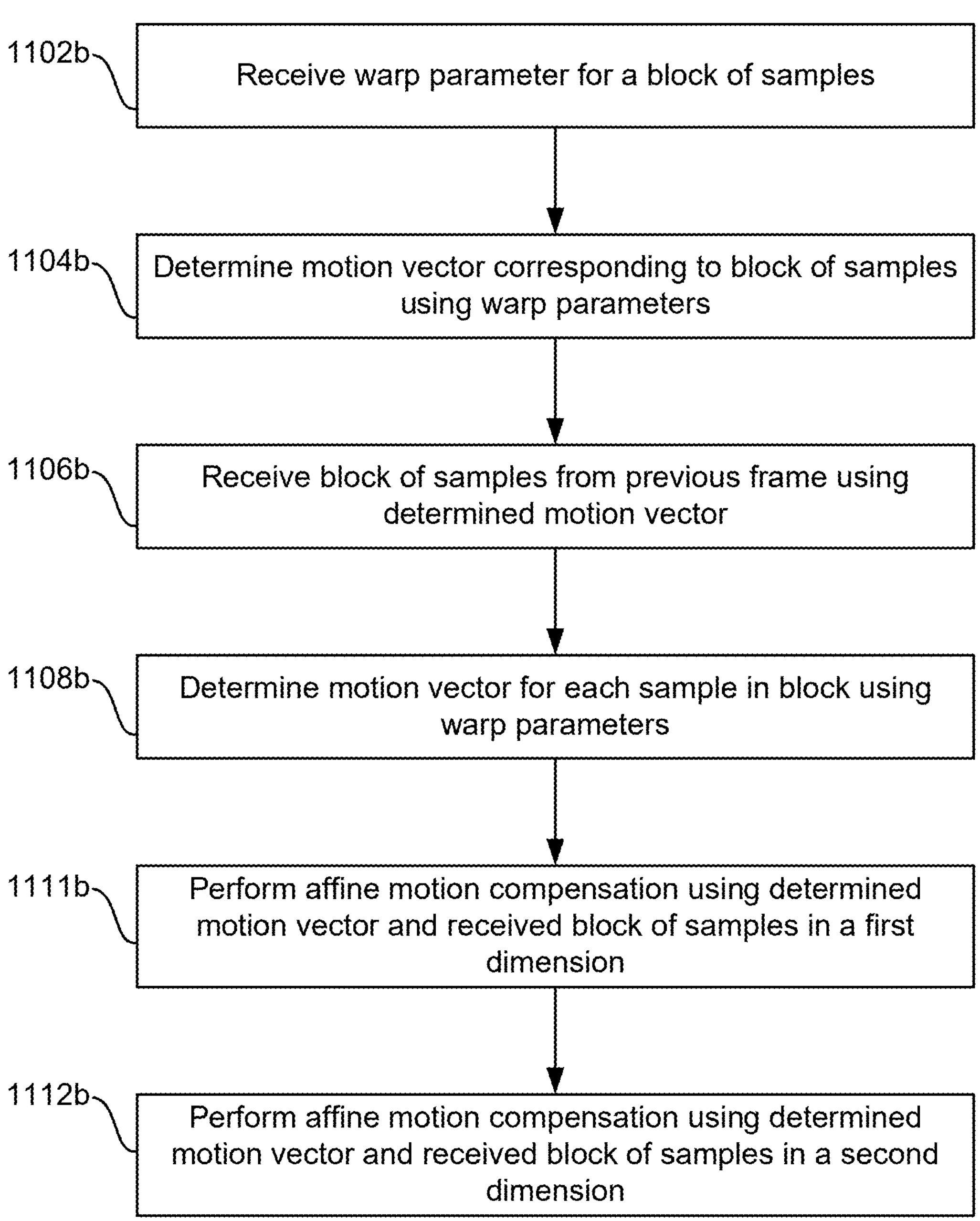

Another example of reduced complexity affine motion compensation is shown in FIG. 11B. Warp parameters are received for a block of samples as input (1102*b*). An initial motion vector (e.g. mvx3, mvy3) for the block of samples is determined using the warp parameters (1104*b*). A block of samples from the previous frame are determined using the initial motion vectors (1106*b*). The warp parameters are then used to determine a motion vector for each sample in the block relative to the initial motion vector (1108*b*). The relative motion vectors may then be used to perform affine motion compensation in a first dimension (1111*b*). The affine motion compensation process then uses the relative motion vectors and the result of the first dimension operation to perform affine motion compensation in a second dimension (1112*b*). This processing in a first dimension and a second dimension may also be referred to as a two-step process.

Figure 11C:
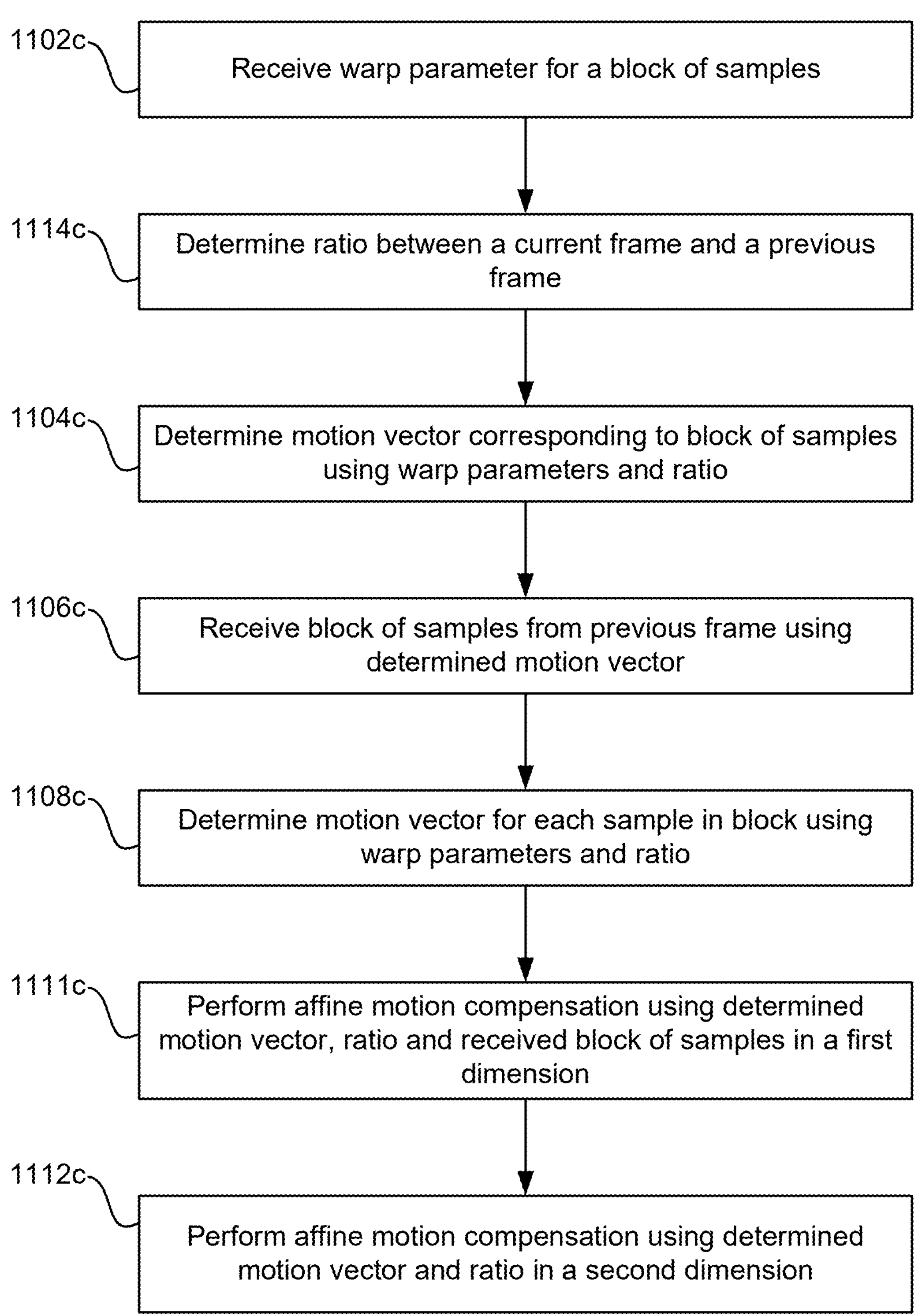

Another example of reduced complexity affine motion compensation is shown in FIG. 11C. Warp parameters are received for a block of samples of a current frame as input (1102*c*). A ratio (also referred to as a scaling factor) between the current frame and a previous frame is determined (1114c). An initial motion vector (e.g. mvx3, mvy3) for the block of samples is determined using the warp parameters and ratio (1104c). A block of samples from the previous frame are determined using the initial motion vector (1106c). The warp parameters and ratio are then used to determine a motion vector for each sample in the block relative to the initial motion vector (1108c). The relative motion vectors and ratio may then be used to perform affine motion compensation in a first dimension (1111c). The affine motion compensation process then uses the relative motion vectors, ratio, and the result of the first dimension operation to perform affine motion compensation in a second dimension (1112c). A ratio between frames may be used to perform affine motion compensation using a two step process (i.e. successively performing affine motion compensation in a first dimension and a second dimension).

Figure 11D:
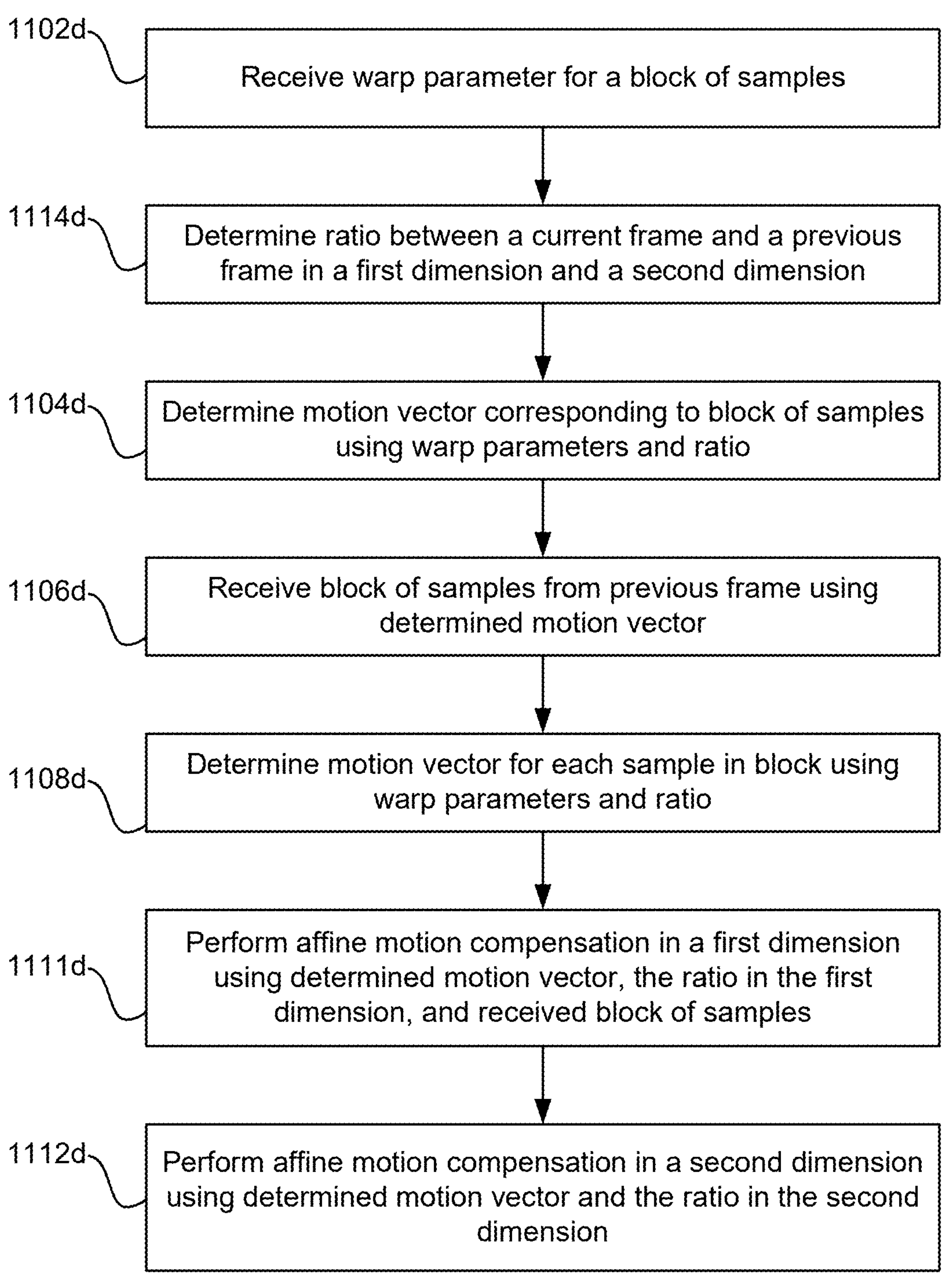

Another example of reduced complexity affine motion compensation is shown in FIG. 11D. Warp parameters are received for a block of samples of a current frame as input (1102d). Ratios (also referred to as scaling factors) between the current frame and a previous frame are determined for a first dimension and a second dimension (1114d). An initial motion vector (e.g. mvx3, mvy3) for the block of samples is determined using the warp parameters and ratios (1104d). A block of samples from the previous frame are determined using the initial motion vector (1106d). The warp parameters and ratios are then used to determine a motion vector for each sample in the block relative to the initial motion vector (1108d). The relative motion vectors and ratio in the first dimension may then be used to perform affine motion compensation in a first dimension (1111d). The affine motion compensation process then uses the relative motion vectors, ratio in the second dimension, and the result of the first dimension operation to perform affine motion compensation in a second dimension (1112d). The affine motion compensation process of FIG. 11d determines ratios between a current frame containing a block of samples and a previous frame in a first dimension and a second dimension. The examples uses the ratio to perform affine motion compensation using a two step process (i.e. successively performing affine motion compensation in a first dimension and a second dimension). The first step is dependent on the scaling ratio in the first dimension. The second step is dependent on the scaling ratio in the second dimension.

In some embodiments, the first step may use the determined ratio to perform a decimation operation in the first dimension. In some implementations, the second step uses the scaling ratio to perform a decimation operation in the second dimension.

In some embodiments, the first step uses the scaling ratio to perform a bi-linear sampling operation in the first dimension. In some embodiments, the second step uses the scaling ratio to perform a bi-linear sampling operation in the second dimension.

Figure 12:
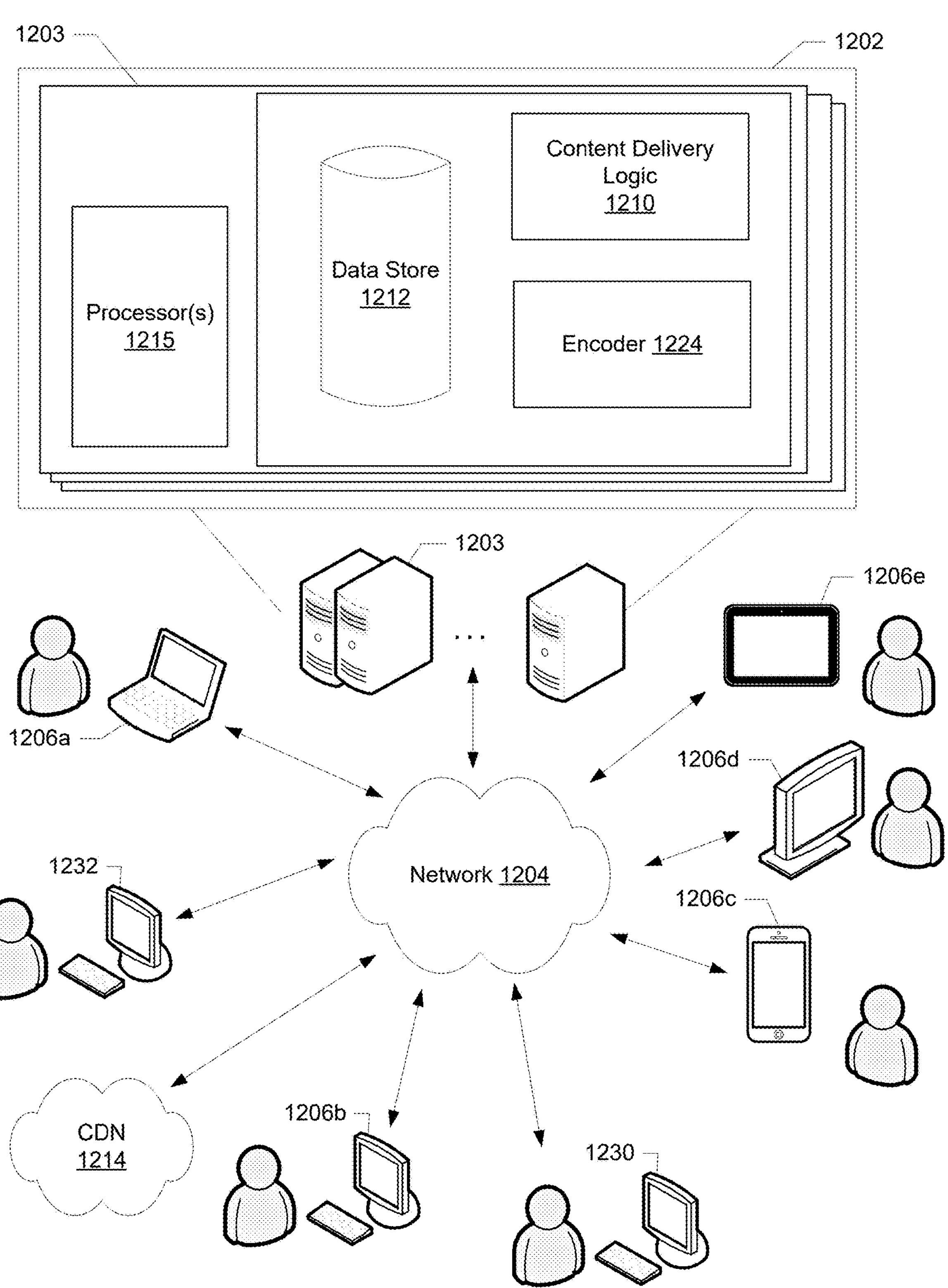
FIG. 12 illustrates an example computing environment in which video data may be encoded, according to some embodiments.

FIG. 12 illustrates an example of a computing environment in which a video content service 1202 provides streaming content for various content types such as a live event, linear playout, and/or video-on-demand (VOD) content (e.g., video and/or audio), etc. via network 1204 to a variety of client devices (1206-1 through 1206-5) in accordance with the techniques described herein. In various implementations, the streaming content may be content from a video content library or a video presentation of a live event (e.g., a livestream, broadcast, and/or camera feed of an ongoing live event and/or a recording of a partially or fully-completed event which may also be referred to as formerly-live event). In some implementations, the streaming content may be linear playout content, e.g., regularly scheduled content that may include VOD or live event content. In some implementations, the streaming content may be video on demand content. Content service 1202 may conform to any of a wide variety of architectures such as, for example, a services platform deployed at one or more co-locations, each implemented with one or more servers 1203. Servers 1203 can include one or more processors 1215, memory, and other hardware for performing the tasks disclosed herein. Network 1204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc.

Client devices 1206a-e may be any suitable device capable of connecting to network 1204 for streaming on-demand and live streaming content provided by service 1202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches), etc.

Content service 1202 may encode (using encoders 1224) video content such as source video content or captured video of a live event for delivery as a plurality of live streams that include different quality-level and bitrate versions of the content. Encoder 1224 encodes media content that it receives from content providers such as, for example, content service 1202, a third party content provider, an advertisement exchange server, etc. Encoding parameters and/or profiles are used to encode and package fragments of media content at various bitrates. Content may be encoded using a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). For example, client device 1206a might receive fragments encoded at a bitrate of 3,200 kbps, and client device 1206b might receive fragments encoded at a bitrate of 2,300 kbps. And depending on their network conditions might both begin to receive fragments at a bitrate of 3,200 kbps. After an encoding process, encoded fragments are stored in memory such as a local buffer for delivery to CDN 1214 or to client devices 1206a-e.

Content service 1202 may deliver a plurality of streams that include different quality-level and bitrate versions of the content. Content service 1202 may also deliver live streams according to a number of streaming protocols including, for example, HTTP Live Streaming (HLS), Dynamic Adaptive Streaming over HTTP (DASH), and Smooth Streaming. Live streaming clients (e.g., device 1206a) consume the live content (delayed only a few seconds from the live action) using live manifests that are periodically made available by content service 1202 as additional content is encoded and packaged. Fragments of content are then delivered over network 1204.

In addition to providing access to media content, server 1203 may also provide a variety of information related to the media content (e.g., various types of metadata and manifest data in data store 1212 to which service 1202 provides access). Alternatively, such information about the media content, as well as the media content itself may be provided and/or hosted by one or more separate platforms or databases, e.g., CDN 1214. CDN 1214 may help facilitate distribution of media content through a variety of software, hardware, and network components to client devices according to, for example, geographic proximity.

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity controlling content service 1202. Alternatively, such resources may be independent of content service 1202, e.g., on a platform under control of a separate provider of computing resources with which content service 1202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the following examples and for the sake of simplicity, content service 1202 is described as if it is integrated with or includes the platform(s) that provides content to client devices. However, it will be understood that content service 1202 may provide access to primary and/or secondary replacement content in conjunction with one or more content delivery networks (e.g., CDN 1214) that may or may not be independent of content service 1202. Implementations are contemplated in which content may be stitched and/or encoded, and/or metadata manipulated by a service that is integrated with a content service (e.g., 1202), by a service associated with the content provider, or as a third-party service. The range of variations known to those of skill in the art are contemplated to be within the scope of this disclosure.

Implementations enabled by the present disclosure contemplate logic resident on the client devices consuming video content from content service 1202; such logic is configured to request video fragments of media presentations having one of various available bitrates, such as live events, linear playout, or VOD content. Such logic might be part of an existing algorithm or module on the client device or implemented to work in conjunction with such an algorithm or module.

Content service 1202 includes content delivery logic 1210 that facilitates at least some aspects of content delivery to client devices 1206. In some implementations, content delivery logic 1210 facilitates providing segments of a live event, attributes associated with regions of frames of the segments, and secondary content as enabled by the present disclosure. In addition, content delivery logic 1210 may include a personalization engine that selects one or more secondary content based, at least in part, on preferences of a user of a client device, characteristics of the user, characteristics of the client device, attributes of secondary content available in a repository of secondary content, and/or attributes of original segments of media content corresponding to regions for overlaying secondary content.

Content service 1202 may also include a variety of information related to primary content and secondary content used to overlay on regions of the primary content. The information can include the primary and/or the secondary content, associated metadata, and manifests in data store 1212 to which service 1202 provides access. Alternatively, such information associated with and/or about the content, as well as the content itself may be provided and/or hosted by one or more separate platforms, e.g., CDN 1214 or remote cloud storage. It should be noted that, while logic 1210 and 1224, and data store 1212 are shown as integrated with content service 1202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Client devices 1206*a-e* can also include various types of logic, for instance, decoder logic for decoding the encoded media content received from edge server 1204*a* and playback handling logic to request playback of portions of media content. In addition, client devices 1206*a-e* includes various types of memory to store and/or cache decoded media, one or more processors, and other hardware components to request and decode the encoded media content provided by server 1203. For example, the processors of client devices 1206*a-e* execute stored instructions in memory to implement decoding and content retrieval techniques to acquire and play back content provided in accordance with the techniques disclosed herein. In addition, client devices 1206*a-e* may communicate with server 1203 through different types of network protocols such as a stateful connection, e.g., a physical socket connection between server and client, or using a stateless connection, for instance, using the Hypertext Transfer Protocol (HTTP).

Embodiments of the disclosure can be described in view of the following clauses:

Clause 1. A method, comprising: obtaining video content and a motion vector between a block of samples in a prediction frame of the video content and a previous frame of the video content that has been encoded and decoded; determining a first ratio of the previous frame to the prediction frame in a first dimension and a second ratio of the previous frame to the predicted frame in a second dimension, wherein either the first ratio, the second ratio, or both are greater than 1; identifying a block of samples in the previous frame using a location of the block of samples in the prediction frame, the motion vector, the ratio in the first dimension, and the ratio in the second dimension; and coding the block of samples in the prediction frame based on the block of samples in the previous frame of the video content using a translational motion compensation process, wherein non-adjacent samples of the block of samples in the previous frame are used to determine motion compensated pixel values for the block of samples in the prediction frame, wherein the non-adjacent samples are selected based on the first ratio and the second ratio.

Clause 2. The method of clause 1, wherein determining the first ratio comprises determining a fraction of the resolution of the previous frame in the first dimension divided by the resolution of the prediction frame in the first dimension, wherein the fraction is rounded to 1.5, 2, 3, 4, or 6.

Clause 3. The method of any one of clauses 1-2, further comprising generating an intermediate block based on the portion of the previous frame, wherein the intermediate block comprises intermediate samples generated by a first filtering operation in the first dimension, wherein coding the block of samples in the prediction frame is based on the intermediate block.

Clause 4. The method of any one of clauses 1-3, wherein coding of the block of samples in the prediction frame is based on applying, to individual locations x, y of the block of samples in the prediction frame, Prediction(x, y)=Sum (Filter(i, j)*Previous(Sx*(x+mvx−i), Sy*(y+mvy−j))), wherein Prediction corresponds to the prediction frame, Sx corresponds to the first ratio, Sy corresponds to the second ratio, mvx corresponds to an x-component of the motion vector, mvy corresponds to a y-component of the motion vector, Previous corresponds to the previous frame, Filter is a filter kernel having m width and n height, i is equal to all integer values in the range of −m/2 to m/2, and j is equal to all integer values in the range −n/2 to n/2.

Clause 5. A method, comprising: obtaining video content; and coding a portion of a first frame of the video content based on a portion of a second frame of the video content using a translational motion compensation process, wherein a resolution of the first frame is less than a resolution of the second frame, wherein non-adjacent samples of the second frame are used to determine motion compensated pixel values for the portion of the first frame, wherein the non-adjacent samples are selected based on a ratio of the resolution of the second frame to the resolution of the first frame.

Clause 6. The method of clause 5, wherein coding the portion of the first frame comprises encoding the portion of the first frame.

Clause 7. The method of any one of clauses 5-6, further comprising obtaining a motion vector between the portion of the first frame and the portion of the second frame, wherein the translational motion compensation process comprises: identifying a first sample in the portion of the second frame based on a location of a second sample in the portion of the first frame, the motion vector, and the ratio; identifying a set of samples in the portion of the second frame based on a location of the first sample and the ratio, wherein individual samples of the set of samples are non-adjacent to other samples in the set of samples and wherein the set of samples includes the first sample; and coding the second sample based on the subset of samples.

Clause 8. The method of clause 7, wherein coding the second sample comprises applying a filter from a set of filters to the set of samples, wherein the filter is selected based on a quotient of the fractional component of the motion vector divided by a sub-pel accuracy.

Clause 9. The method of any one of clauses 7-8, wherein identifying the set of samples comprises multiplying the ratio by the sum of the location of the second sample and an integer portion of the motion vector.

Clause 10. The method of any one of clauses 5-9, wherein determining the ratio comprises determining a fraction of the resolution of the second frame divided by the resolution of the first frame, wherein the fraction is rounded to 1.5, 2, 3, 4, or 6.

Clause 11. The method of any one of clauses 5-10, wherein the second frame is a previously encoded and decoded frame.

Clause 12. The method of any one of clauses 5-11, wherein the ratio comprises a ratio in a vertical dimension and a ratio in a horizontal dimension, and wherein the translational motion compensation process comprises a first filtering operation in the vertical dimension and a second filtering operation in the horizontal dimension.

Clause 13. The method of clause 12, wherein the translational motion compensation process comprises generating an intermediate block based on the portion of the second frame, wherein the intermediate block comprises intermediate samples generated by the first filtering operation, wherein the portion of the first frame is coded based on the intermediate block.

Clause 14. The method of any one of clauses 5-13, wherein coding of the portion of the first frame is based on applying, to individual locations x, y of the portion of the first frame, Prediction(x, y)=Sum(Filter(i, j)*Previous(Sx*(x+mvx−i), Sy*(y+mvy−j))), wherein Prediction corresponds to the first frame, Sx corresponds to a horizontal ratio between the resolution of the first frame and the resolution of the second frame, Sy corresponds to a vertical ratio between the resolution of the first frame and the resolution of the second frame, mvx corresponds to an x-component of a motion vector between the portion of the first frame and the portion of the second frame, mvy corresponds to a y-component of a motion vector between the portion of the first frame and the portion of the second frame, Previous corresponds to the second frame, Filter is a filter kernel having m width and n height, i is equal to all integer values in the range of −m/2 to m/2, and j is equal to all integer values in the range −n/2 to n/2.

Clause 15. A system, comprising one or more processors and one or more memories, the one or more memories storing computer-executable instructions that, when executed by the one or more processors, causes the one or more processors to perform operations including: obtaining a bitstream representing encoded video content; and decoding a portion of a first frame of the video content based on a portion of a second frame of the video content using a translational motion compensation process, wherein a resolution of the first frame is less than a resolution of the second frame, wherein non-adjacent samples of the second frame are used to determine motion compensated pixel values for the portion of the first frame, wherein the non-adjacent samples are selected based on a ratio of the resolution of the second frame to the resolution of the first frame.

Clause 16. The system of clause 15, wherein the one or more memories storing additional computer-executable instructions for obtaining a motion vector between the portion of the first frame and the portion of the second frame, wherein the translational motion compensation process comprises: identifying a first sample in the portion of the second frame based on a location of a second sample in the portion of the first frame, the motion vector, and the ratio; identifying a set of samples in the portion of the second frame based on a location of the first sample and the ratio, wherein individual samples of the set of samples are non-adjacent to other samples in the set of samples and wherein the set of samples includes the first sample; and decoding the second sample based on the subset of samples.

Clause 17. The system of clause 16, wherein decoding the second sample comprises applying a filter from a set of filters to the set of samples, wherein the filter is selected based on a quotient of the fractional component of the motion vector divided by a sub-pel accuracy.

Clause 18. The system of clause 16, wherein identifying the set of samples comprises multiplying the ratio by the sum of the location of the second sample and an integer portion of the motion vector.

Clause 19. The system of any one of clauses 15-18, wherein determining the ratio comprises determining a fraction of the resolution of the second frame divided by the resolution of the first frame, wherein the fraction is rounded to 1.5, 2, 3, 4, or 6

Clause 20. The system of any one of clauses 15-19, wherein the second frame is a previously encoded and decoded frame.

Clause 21. The system of any one of clauses 15-20, wherein the ratio comprises a ratio in a vertical dimension and a ratio in a horizontal dimension, and wherein the translational motion compensation process comprises a first filtering operation in the vertical dimension and a second filtering operation in the horizontal dimension.

Clause 22. The system of clause 21, wherein the translational motion compensation process comprises generating an intermediate block based on the portion of the second frame, wherein the intermediate block comprises intermediate samples generated by the first filtering operation, wherein the portion of the first frame is coded based on the intermediate block.

Clause 23. The system of any one of clauses 15-22, wherein decoding of the portion of the first frame is based on applying, to individual locations x, y of the portion of the first frame, Prediction(x, y)=Sum(Filter(i, j)*Previous(Sx*(x+mvx−i), Sy*(y+mvy−j))), wherein Prediction corresponds to the first frame, Sx corresponds to a horizontal ratio between the resolution of the first frame and the resolution of the second frame, Sy corresponds to a vertical ratio between the resolution of the first frame and the resolution of the second frame, mvx corresponds to an x-component of a motion vector between the portion of the first frame and the portion of the second frame, mvy corresponds to a y-component of a motion vector between the portion of the first frame and the portion of the second frame, Previous corresponds to the second frame, Filter is a filter kernel having m width and n height, i is equal to all integer values in the range of −m/2 to m/2, and j is equal to all integer values in the range −n/2 to n/2.

Clause 24. A method, comprising: obtaining video content and two or more control point motion vectors between a block of samples in a prediction frame of the video content and a previous frame of the video content that has been encoded and decoded; determining a first ratio of the previous frame to the prediction frame in a first dimension and second ratio of the previous frame to the predicted frame in a second dimension, wherein either the first ratio, the second ratio, or both are greater than 1; identifying a block of samples in the previous frame using a location of the block of samples in the prediction frame, the control point motion vectors, the ratio in the first dimension, and the ratio in the second dimension; and coding the block of samples in the prediction frame based on the block of samples in the previous frame using an affine motion compensation process, wherein non-adjacent samples of the block of samples in the previous frame are used to determine motion compensated pixel values for the block of samples in the prediction frame, wherein the non-adjacent samples are selected based on the first ratio and the second ratio.

Clause 25. The method of clause 24, wherein block of samples in the prediction frame is coded based on non-adjacent samples of the block of samples in the previous frame based on the ratio.

Clause 26. The method of any one of clauses 24-25, wherein the affine motion compensation process comprises generating an intermediate block based on the second block and the ratio.

Clause 27. The method of clause 26, wherein the intermediate block is generated by a decimation operation where a subset of samples of the second block are selected to form the intermediate block, wherein the subset of samples is selected based on the ratio.

Clause 28. A method, comprising: obtaining video content; and coding a first block of a first frame of the video content based on a second block of a second frame of the video content using an affine motion compensation process, wherein a ratio of the resolution of the second frame to the resolution of the first frame is greater than 1.

Clause 29. The method of clause 28, wherein coding the first block of the first frame comprises encoding the first block of the first frame.

Clause 30. The method of any one of clauses 28-29, wherein determining the ratio comprises determining a fraction of the resolution of the second frame divided by the resolution of the first frame, wherein the fraction is rounded to 1.5, 2, 3, 4, or 6.

Clause 31. The method of any one of clauses 28-30, wherein the first block is coded based on non-adjacent samples of the second block based on the ratio.

Clause 32. The method of any one of clauses 28-31, further comprising obtaining two or more control point vectors associated with the first block, wherein the affine motion compensation process comprises generating motion vectors for the first block based on the two or more control point vectors.

Clause 33. The method of clause 32, further comprising identifying the second block based on the motion vectors and the ratio.

Clause 34. The method of any one of clauses 28-33, wherein the affine motion compensation process comprises generating an intermediate block based on the second block and the ratio.

Clause 35. The method of clause 34, wherein the intermediate block is generated by a decimation operation where a subset of samples of the second block are selected to form the intermediate block, wherein the subset of samples is selected based on the ratio.

Clause 36. The method of any one of clauses 34-35, wherein the affine motion compensation process further comprises coding the first block based on the intermediate block and a set of motion vectors, wherein individual motion vectors of the set of motion vectors are associated with different locations of the first block.

Clause 37. The method of clause 34, wherein the affine motion compensation process comprises: generating the intermediate block based on the second block and a first set of motion vectors, wherein individual motion vectors of the first set of motion vectors are associated with different locations of the first block; and generating motion compensated pixel values for the first block based on the intermediate block and a second set of motion vectors, wherein individual motion vectors of the set of motion vectors are associated with different locations of the first block.

Clause 38. A system, comprising one or more processors and one or more memories, the one or more memories storing computer-executable instructions that, when executed by the one or more processors, causes the one or more processors to perform operations including: obtaining a bitstream representing encoded video content; and decoding a first block of a first frame of the video content based on a second block of a second frame of the video content using an affine motion compensation process, wherein a ratio of the resolution of the second frame to the resolution of the first frame is greater than 1.

Clause 39. The system of clause 38, wherein determining the ratio comprises determining a fraction of the resolution of the second frame divided by the resolution of the first frame, wherein the fraction is rounded to 1.5, 2, 3, 4, or 6

Clause 40. The system of any one of clauses 38-39, wherein the first block is decoded based on non-adjacent samples of the second block based on the ratio.

Clause 41. The system of any one of clauses 38-40, wherein the one or more memories store additional computer-executable instructions for obtaining two or more control point vectors associated with the first block, wherein the affine motion compensation process comprises generating motion vectors for the first block based on the two or more control point vectors.

Clause 42. The system of clause 41, wherein the one or more memories store additional computer-executable instructions for identifying the second block based on the motion vectors and the ratio.

Clause 43. The system of any one of clauses 38-42, wherein the affine motion compensation process comprises generating an intermediate block based on the second block and the ratio.

Clause 44. The system of clause 43, wherein the intermediate block is generated by a decimation operation where a subset of samples of the second block are selected to form the intermediate block, wherein the subset of samples is selected based on the ratio.

Clause 45. The system of any one of clauses 43-44, wherein the affine motion compensation process further comprises decoding the first block based on the intermediate block and a set of motion vectors, wherein individual motion vectors of the set of motion vectors are associated with different locations of the first block.

Clause 46. The system of clause 43, wherein the affine motion compensation process comprises: generating the intermediate block based on the second block and a first set of motion vectors, wherein individual motion vectors of the first set of motion vectors are associated with different locations of the first block; and generating motion compensated pixel values for the first block based on the intermediate block and a second set of motion vectors, wherein individual motion vectors of the set of motion vectors are associated with different locations of the first block.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIGS. 1-4 and/or 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A method, comprising:

obtaining video content and two or more control point motion vectors between a block of samples in a prediction frame of the video content and a previous frame of the video content that has been encoded and decoded;

determining a first ratio of the previous frame to the prediction frame in a first dimension and second ratio of the previous frame to the predicted frame in a second dimension, wherein either the first ratio, the second ratio, or both are greater than 1;

identifying a block of samples in the previous frame using a location of the block of samples in the prediction frame, the control point motion vectors, the ratio in the first dimension, and the ratio in the second dimension; and coding the block of samples in the prediction frame based on the block of samples in the previous frame using an affine motion compensation process, wherein non-adjacent samples of the block of samples in the previous frame are used to determine motion compensated pixel values for the block of samples in the prediction frame, wherein the non-adjacent samples are selected based on the first ratio and the second ratio, wherein the affine motion compensation process comprises generating an intermediate block based on the second block, the first ratio, and the second ratio, wherein the intermediate block is not included in a coded bitstream.

2. The method of claim 1, wherein block of samples in the prediction frame is coded based on non-adjacent samples of the block of samples in the previous frame based on the first ratio, the second ratio, or both.

3. The method of claim 1, wherein the intermediate block is generated by a decimation operation where a subset of samples of the second block are selected to form the intermediate block, wherein the subset of samples is selected based on the first ratio, the second ratio, or both.

4. A method, comprising:

obtaining video content; and coding a first block of a first frame of the video content based on a second block of a second frame of the video content using an affine motion compensation process, wherein a ratio of the resolution of the second frame to the resolution of the first frame is greater than 1, wherein the affine motion compensation process comprises generating an intermediate block based on the second block and the ratio, wherein the intermediate block is not included in a coded bitstream.

5. The method of claim 4, wherein coding the first block of the first frame comprises encoding the first block of the first frame.

6. The method of claim 4, wherein determining the ratio comprises determining a fraction of the resolution of the second frame divided by the resolution of the first frame, wherein the fraction is rounded to 1.5, 2, 3, 4, or 6.

7. The method of claim 4, wherein the first block is coded based on non-adjacent samples of the second block based on the ratio.

8. The method of claim 4, further comprising obtaining two or more control point vectors associated with the first block, wherein the affine motion compensation process comprises generating motion vectors for the first block based on the two or more control point vectors.

9. The method of claim 8, further comprising identifying the second block based on the motion vectors and the ratio.

10. The method of claim 4, wherein the intermediate block is generated by a decimation operation where a subset of samples of the second block are selected to form the intermediate block, wherein the subset of samples is selected based on the ratio.

11. The method of claim 4, wherein the affine motion compensation process further comprises coding the first block based on the intermediate block and a set of motion vectors, wherein individual motion vectors of the set of motion vectors are associated with different locations of the first block.

12. The method of claim 4, wherein the affine motion compensation process comprises:

generating the intermediate block based on the second block and a first set of motion vectors, wherein individual motion vectors of the first set of motion vectors are associated with different locations of the first block; and generating motion compensated pixel values for the first block based on the intermediate block and a second set of motion vectors, wherein individual motion vectors of the set of motion vectors are associated with different locations of the first block.

13. A system, comprising one or more processors and one or more memories, the one or more memories storing computer-executable instructions that, when executed by the one or more processors, causes the one or more processors to perform operations including:

obtaining a bitstream representing encoded video content; and decoding a first block of a first frame of the video content based on a second block of a second frame of the video content using an affine motion compensation process, wherein a ratio of the resolution of the second frame to the resolution of the first frame is greater than 1, wherein the affine motion compensation process comprises generating an intermediate block based on the second block and the ratio, wherein the intermediate block is not included in a coded bitstream.

14. The system of claim 13, wherein determining the ratio comprises determining a fraction of the resolution of the second frame divided by the resolution of the first frame, wherein the fraction is rounded to 1.5, 2, 3, 4, or 6.

15. The system of claim 13, wherein the first block is decoded based on non-adjacent samples of the second block based on the ratio.

16. The system of claim 13, wherein the one or more memories store additional computer-executable instructions for obtaining two or more control point vectors associated with the first block, wherein the affine motion compensation process comprises generating motion vectors for the first block based on the two or more control point vectors.

17. The system of claim 16, wherein the one or more memories store additional computer-executable instructions for identifying the second block based on the motion vectors and the ratio.

18. The system of claim 13, wherein the intermediate block is generated by a decimation operation where a subset of samples of the second block are selected to form the intermediate block, wherein the subset of samples is selected based on the ratio.

19. The system of claim 13, wherein the affine motion compensation process further comprises decoding the first block based on the intermediate block and a set of motion vectors, wherein individual motion vectors of the set of motion vectors are associated with different locations of the first block.

20. The system of claim 13, wherein the affine motion compensation process comprises:

generating the intermediate block based on the second block and a first set of motion vectors, wherein individual motion vectors of the first set of motion vectors are associated with different locations of the first block; and generating motion compensated pixel values for the first block based on the intermediate block and a second set of motion vectors, wherein individual motion vectors of the set of motion vectors are associated with different locations of the first block.

* * * * *